April 7, 1959   J. E. CARROLL   2,880,891
CONVEYER CONTROL SYSTEM
Filed Dec. 31, 1956   19 Sheets-Sheet 1
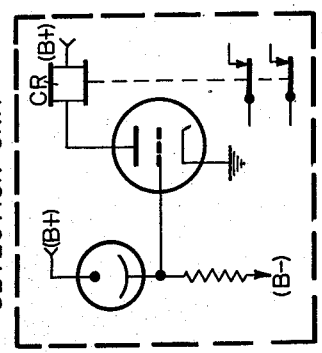
FIG. 5.
TYPICAL PHOTOCELL DETECTION UNIT
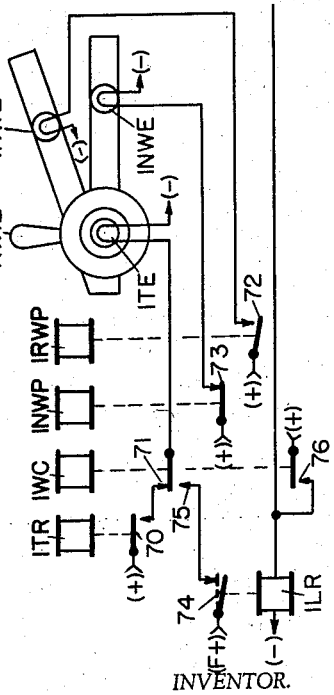
FIG. 1.
FIG. 4.
INVENTOR.
J. E. CARROLL
BY
Forest B. Hitchcock
HIS ATTORNEY

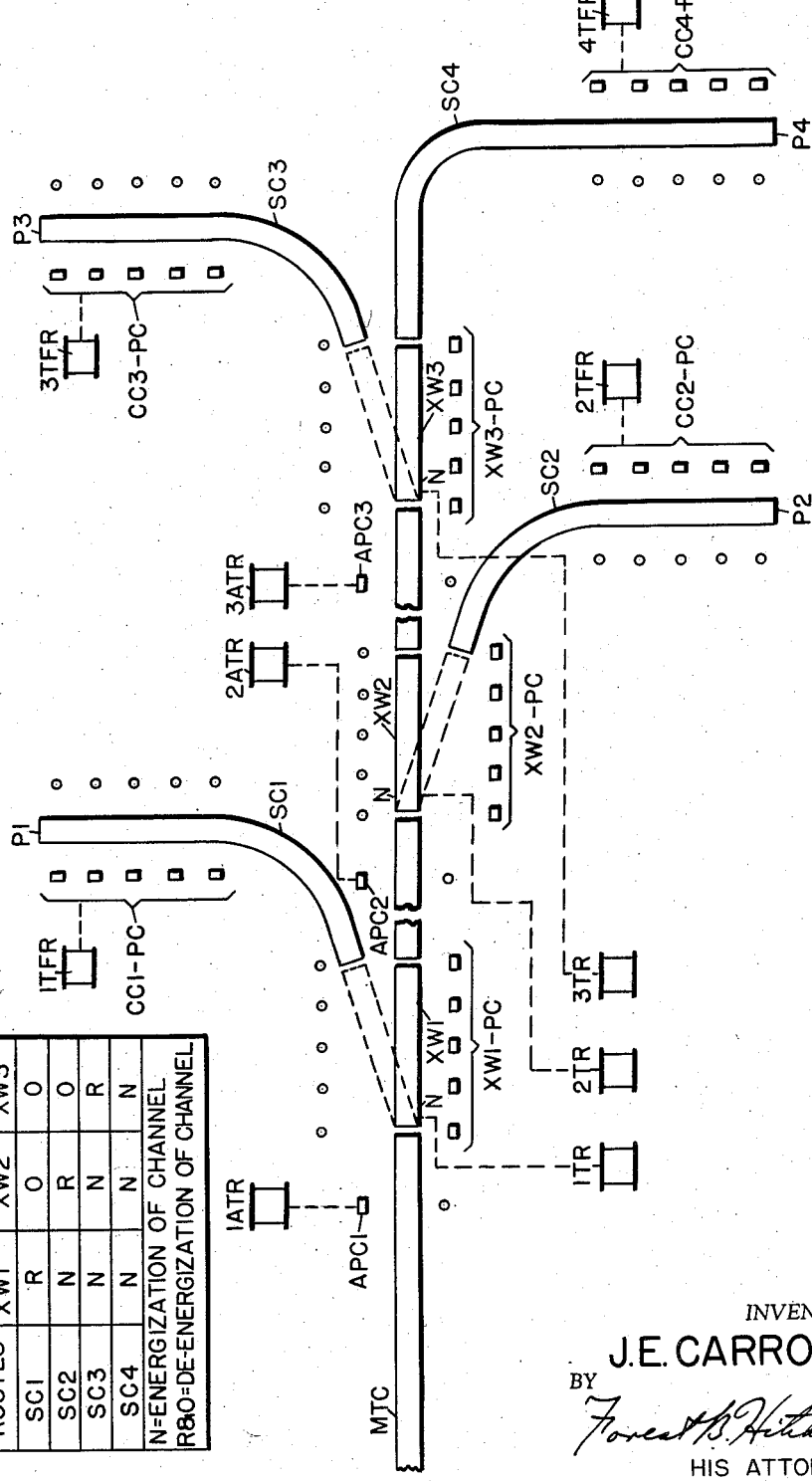

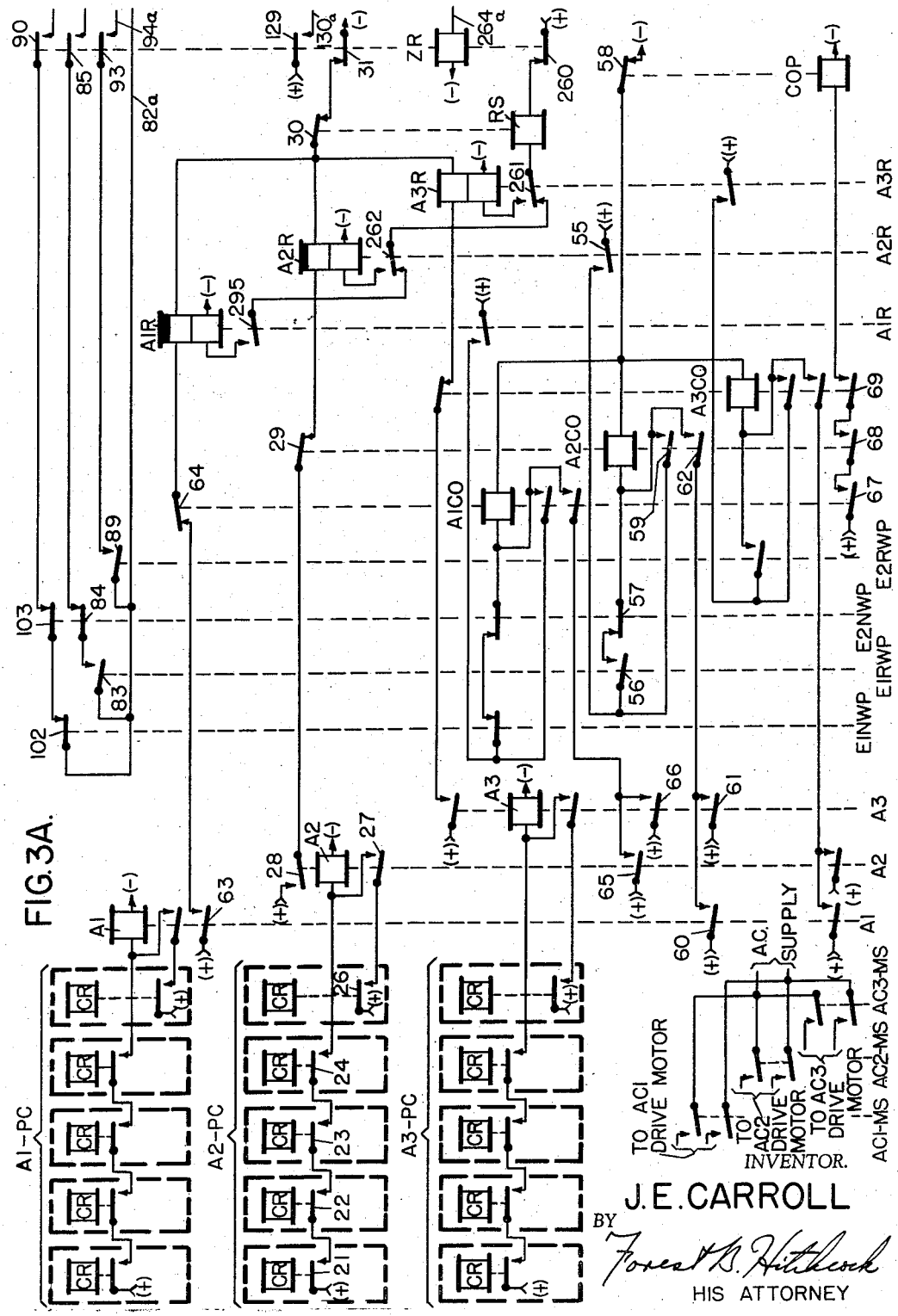

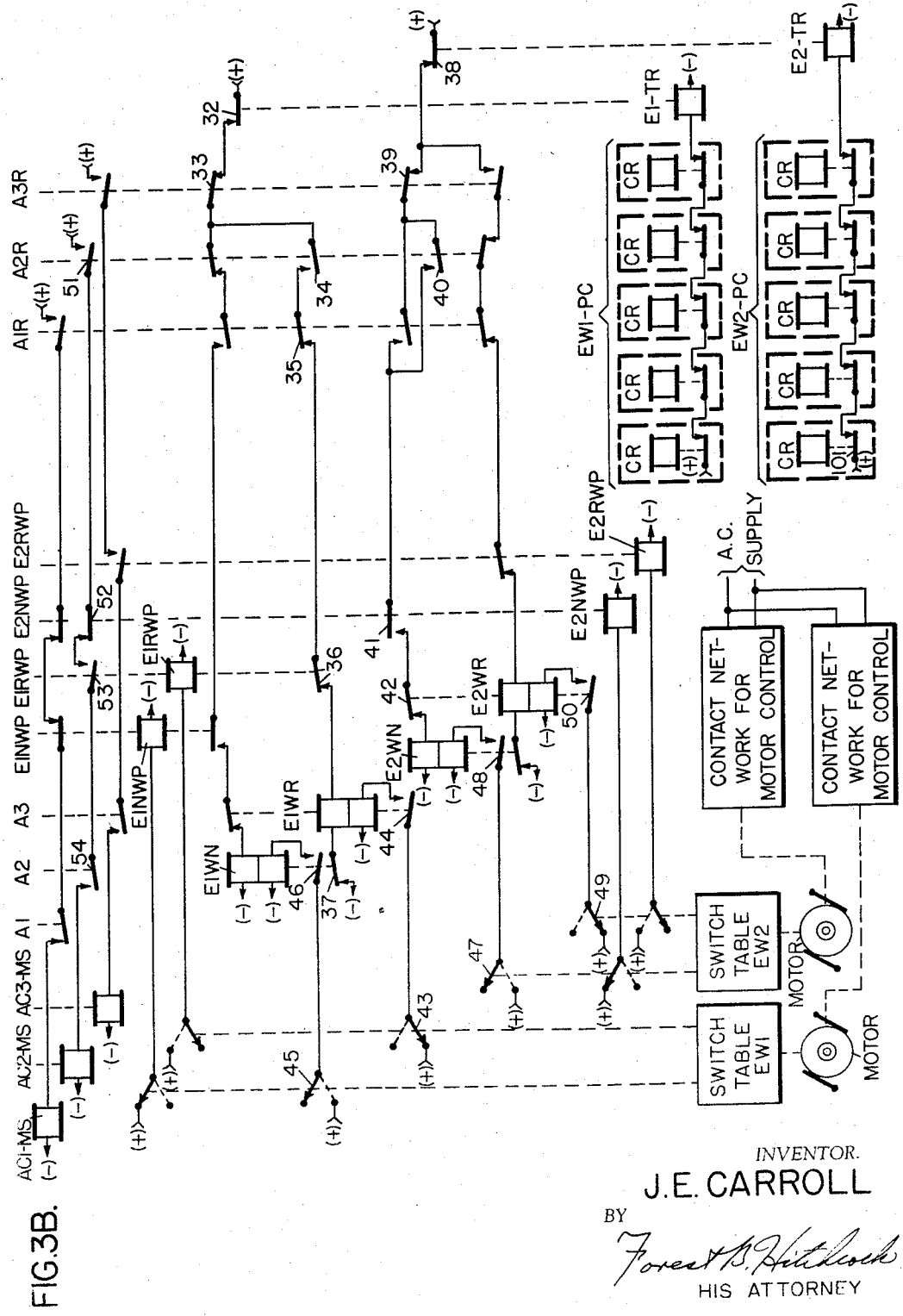

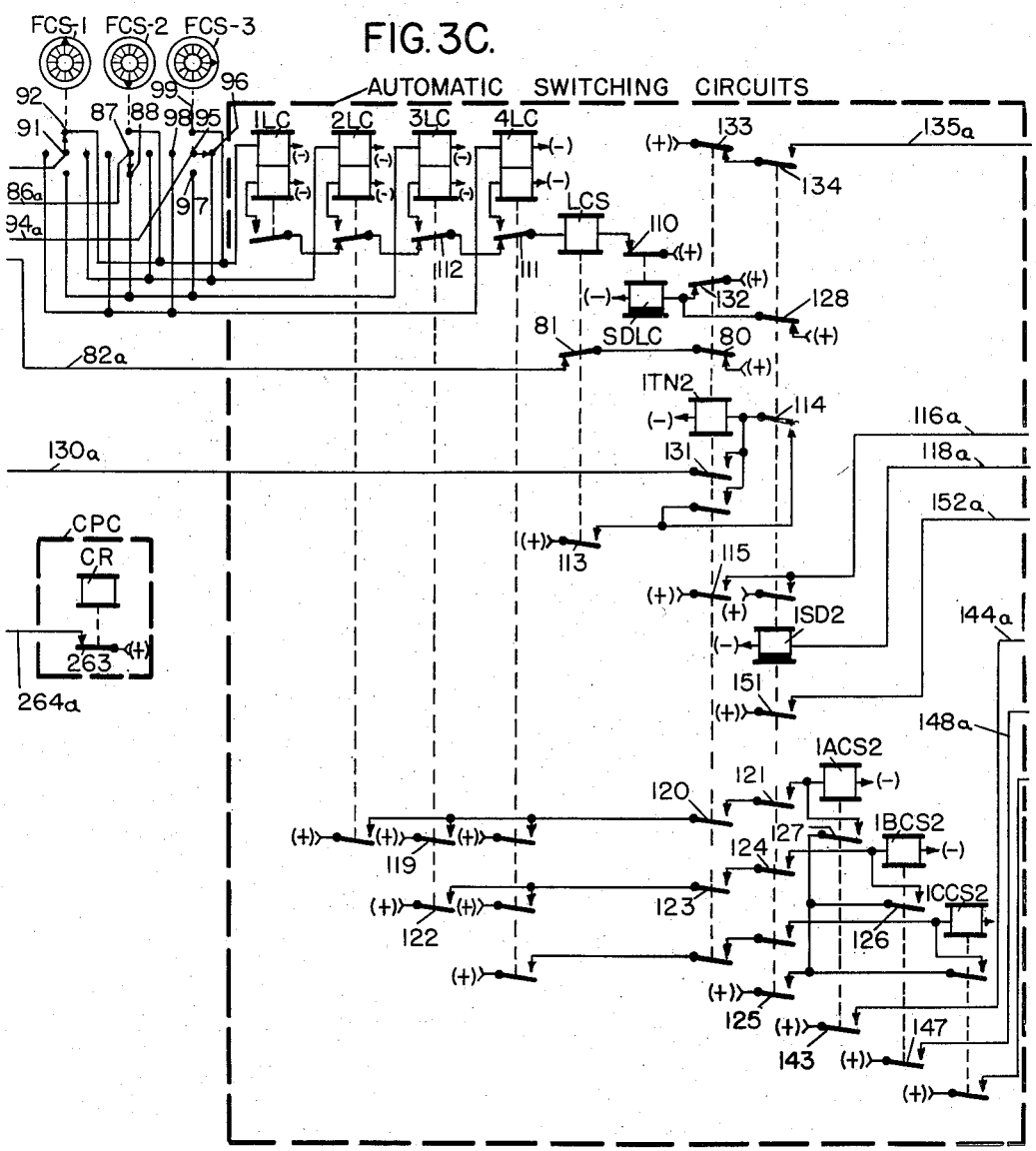

April 7, 1959 J. E. CARROLL 2,880,891
CONVEYER CONTROL SYSTEM
Filed Dec. 31, 1956 19 Sheets-Sheet 7

INVENTOR.
J. E. CARROLL
BY
Forest B. Hitchcock
HIS ATTORNEY

April 7, 1959

J. E. CARROLL 2,880,891

CONVEYER CONTROL SYSTEM

Filed Dec. 31, 1956

CONTROLLED BY PHOTO CELL UNITS CC2-PC

SWITCH CONTROL CONTACT NETWORK

INVENTOR.
J. E. CARROLL
BY
Forest B. Hitchcock
HIS ATTORNEY

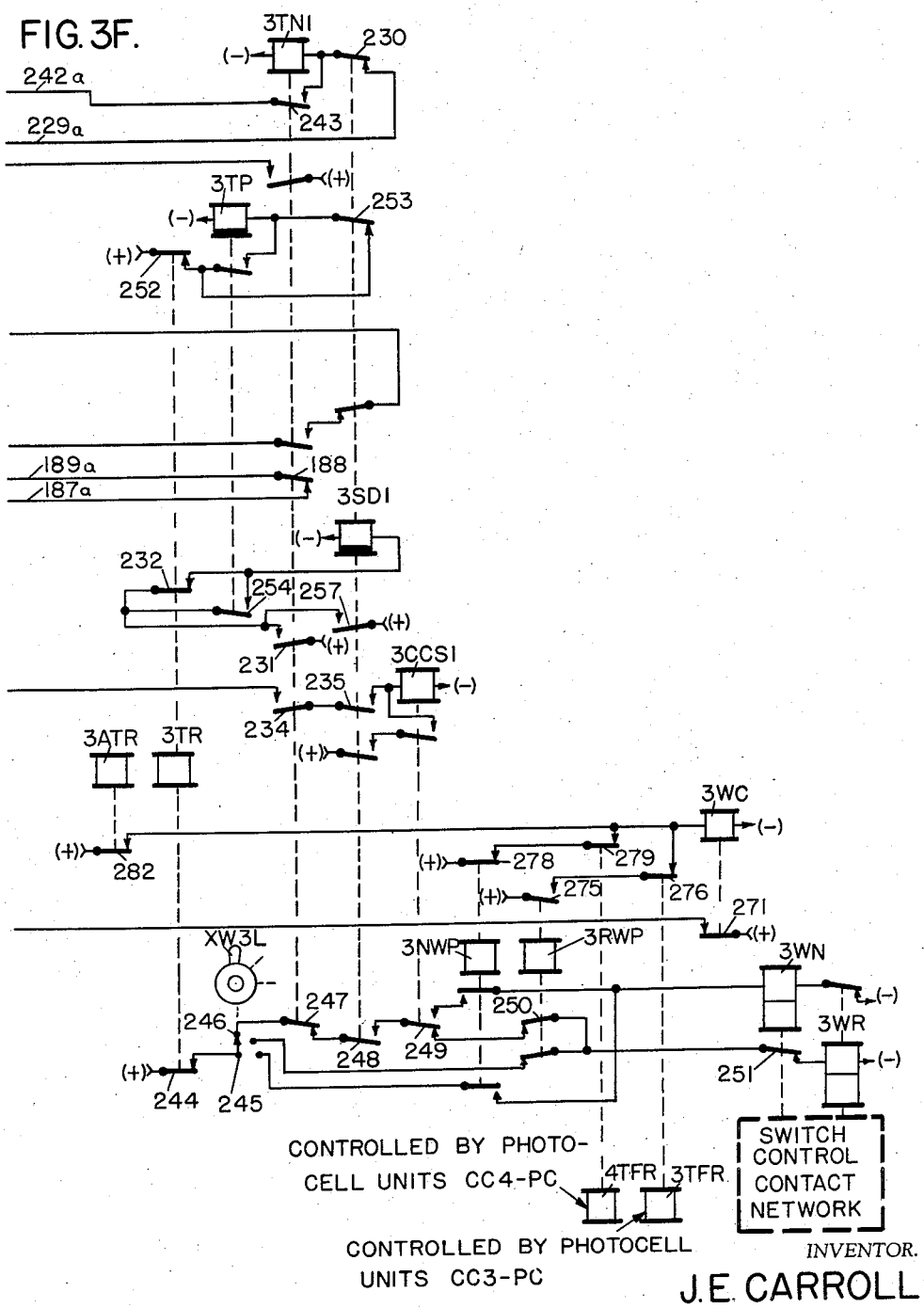

April 7, 1959  J. E. CARROLL  2,880,891
CONVEYER CONTROL SYSTEM
Filed Dec. 31, 1956  19 Sheets-Sheet 10

INVENTOR.
J. E. CARROLL
BY
HIS ATTORNEY

April 7, 1959  J. E. CARROLL  2,880,891
CONVEYER CONTROL SYSTEM
Filed Dec. 31, 1956  19 Sheets—Sheet 11

INVENTOR.
J. E. CARROLL
BY
Forest B. Hitchcock
HIS ATTORNEY

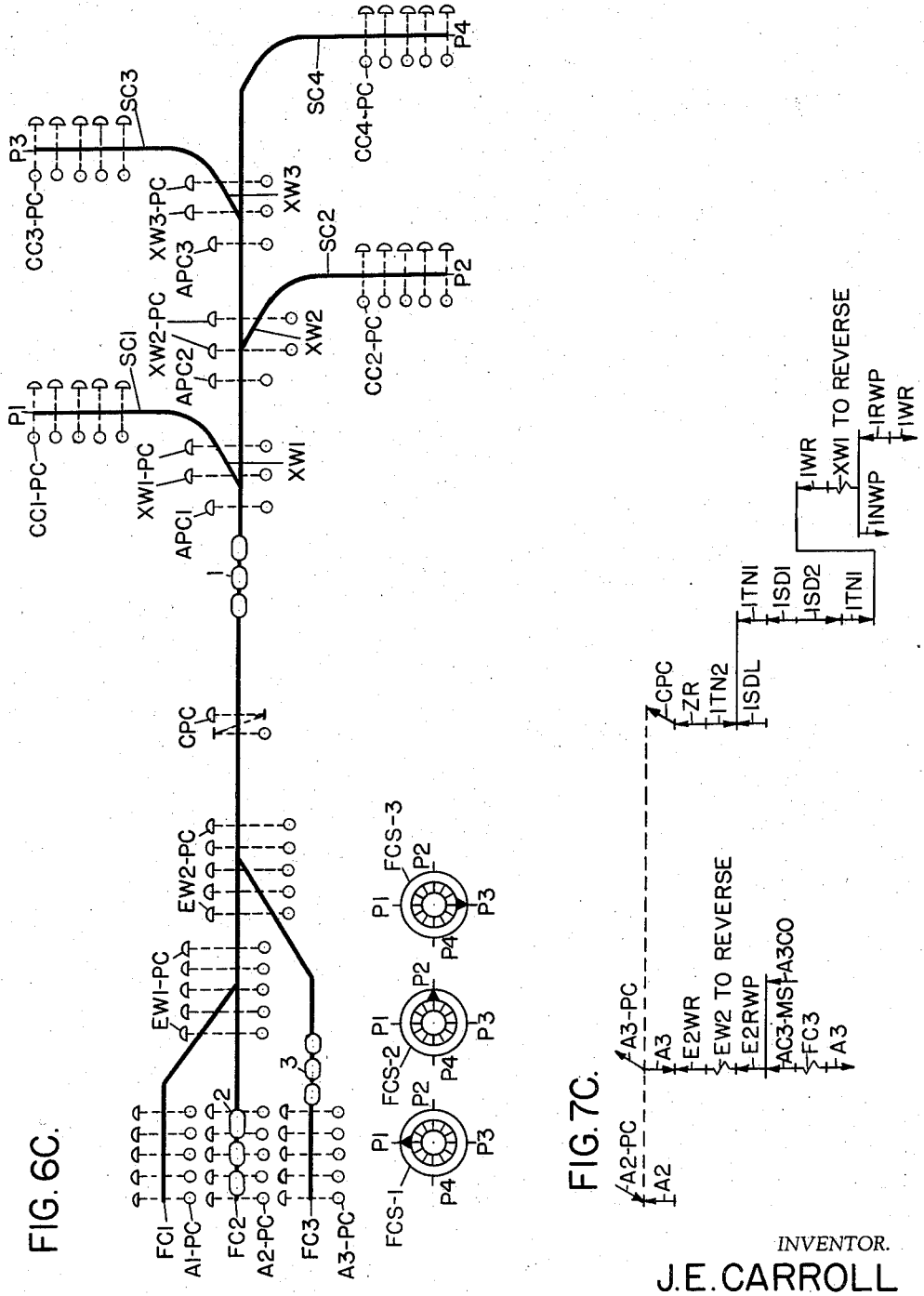

April 7, 1959    J. E. CARROLL    2,880,891
CONVEYER CONTROL SYSTEM
Filed Dec. 31, 1956    19 Sheets-Sheet 13

INVENTOR.
J. E. CARROLL
BY
HIS ATTORNEY

April 7, 1959     J. E. CARROLL     2,880,891
CONVEYER CONTROL SYSTEM
Filed Dec. 31, 1956     19 Sheets-Sheet 14

INVENTOR.
J. E. CARROLL
BY
*Forest B. Hitchcock*
HIS ATTORNEY

April 7, 1959

J. E. CARROLL 2,880,891

CONVEYER CONTROL SYSTEM

Filed Dec. 31, 1956

INVENTOR.
J.E. CARROLL
BY
Forest B. Hitchcock
HIS ATTORNEY

April 7, 1959    J. E. CARROLL    2,880,891
CONVEYER CONTROL SYSTEM
Filed Dec. 31, 1956    19 Sheets-Sheet 16

INVENTOR.
J. E. CARROLL
BY
Forest B. Hitchcock
HIS ATTORNEY

INVENTOR.
J. E. CARROLL
BY
HIS ATTORNEY

April 7, 1959   J. E. CARROLL   2,880,891
CONVEYER CONTROL SYSTEM
Filed Dec. 31, 1956   19 Sheets-Sheet 19

FIG. 8.

N = NORMAL POSITION OF SWITCH
R = REVERSE POSITION OF SWITCH

INVENTOR.
J. E. CARROLL
BY
HIS ATTORNEY

United States Patent Office 2,880,891
Patented Apr. 7, 1959

2,880,891

CONVEYER CONTROL SYSTEM

John E. Carroll, Springdale, Conn., assignor to General Railway Signal Company, Rochester, N.Y.

Application December 31, 1956, Serial No. 631,933

22 Claims. (Cl. 214—11)

This invention relates to conveying systems, and relates more particularly to conveying systems wherein several feed conveyers alternately transport articles to a main transport conveyer and deliver the articles to one of several exit conveyers in accordance with preselected route descriptions.

An object of the invention is to provide a new and improved control system for conveyers.

Another object of the invention is to provide a new and improved control system for a conveying organization which transports materials in a predetermined sequence from several feed conveyers over a main transport conveyer to one of several exit conveyers according to a preselected manual designation.

A further object of this invention is to provide a control system for conveying apparatus having means for properly spacing separate groups of materials on the transport conveying portion of the system.

A still further object of this invention is the provision of means for detecting a fully loaded exit conveyer and automatically rerouting a respective group of materials to another exit conveyer or shutting off of the conveying system in the event that there is no available exit conveyer.

Other objects, purposes, and characteristic features of the present invention will be in part obvious from the accompanying drawings, and in part pointed out as the description of the invention progresses.

A clearer understanding of the invention may be had by referring to the following detailed description of the specific embodiment thereof, when read in conjunction with the appended drawings in which like reference characters designate corresponding parts throughout the several views, and in which:

Fig. 1 is a plan view of a control panel for the conveyer and shows the route selecting knobs, and also shows diagrammatically the control panel which includes various levers and indicating lights associated with the manual or direct control of the conveyer exit switches;

Figs. 2A and 2B represent a conveying system in which one embodiment of the present invention can be applied;

Fig. 2C is a code chart indicating the manner in which particular route storage relays are controlled for particular selected exit routes;

Figure 2A:
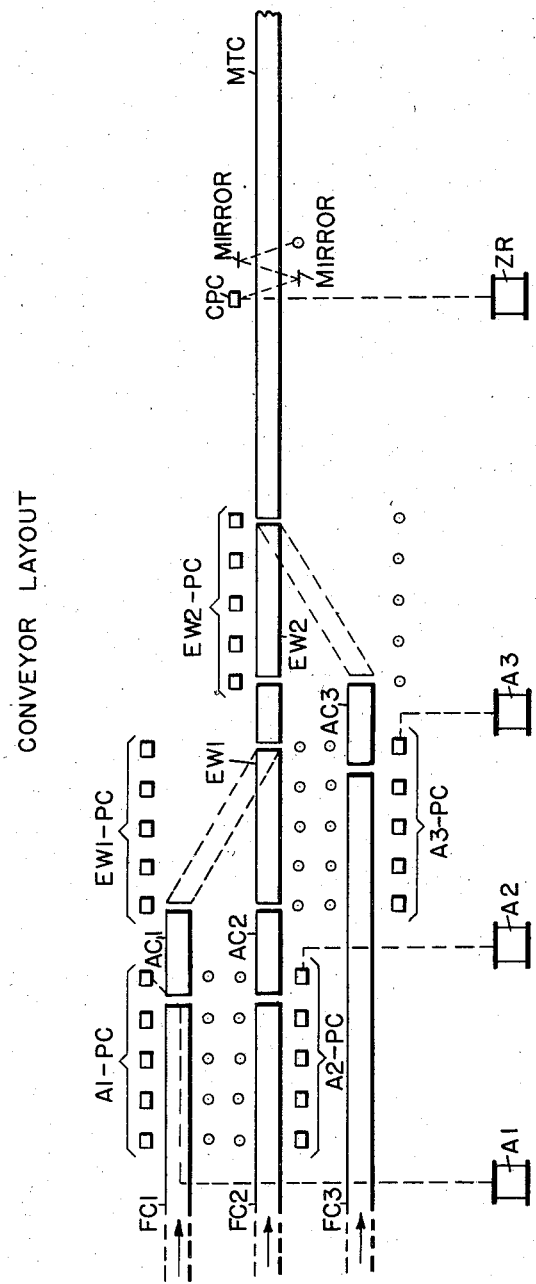
Figure 3D:
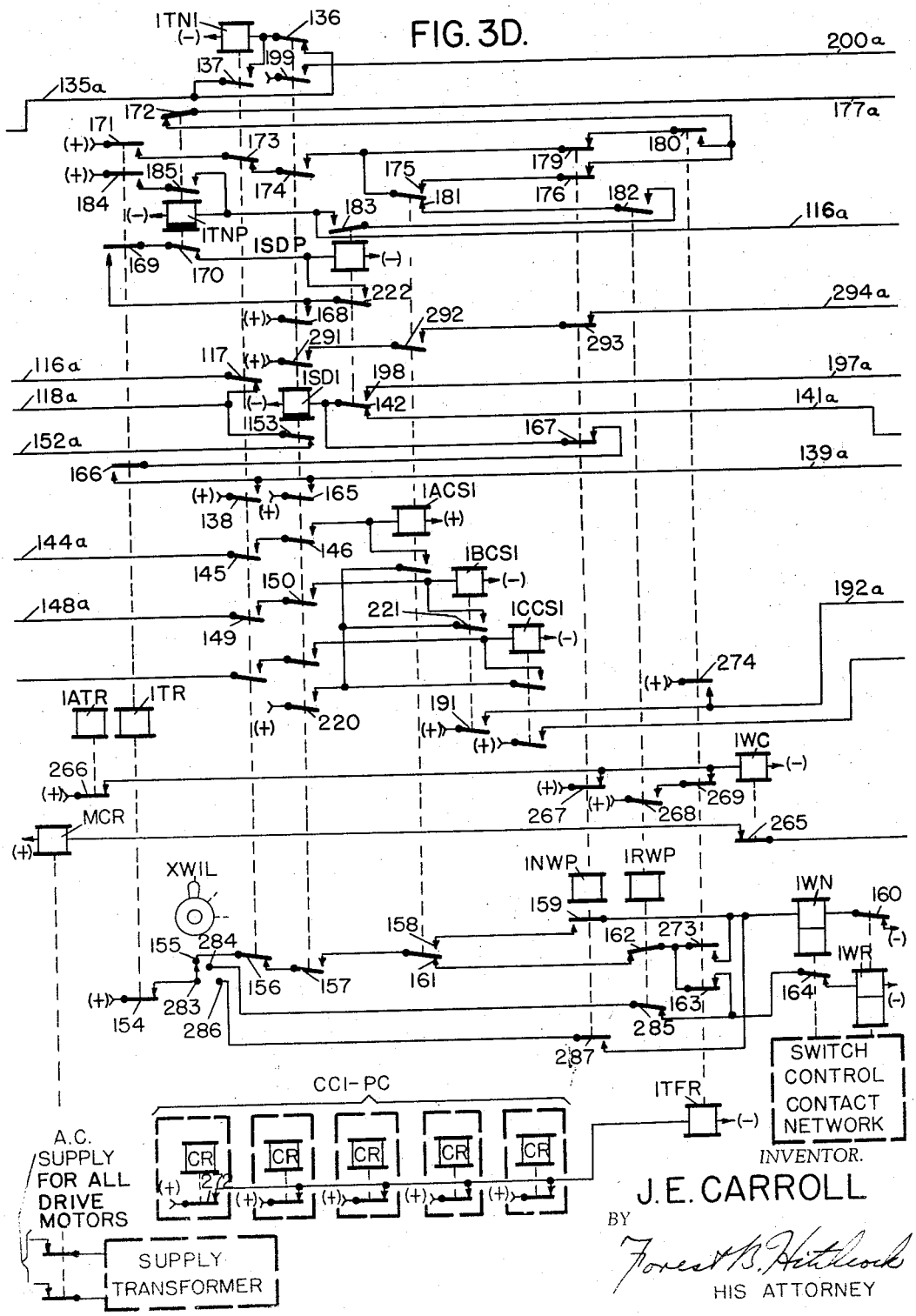
Figure 3E:
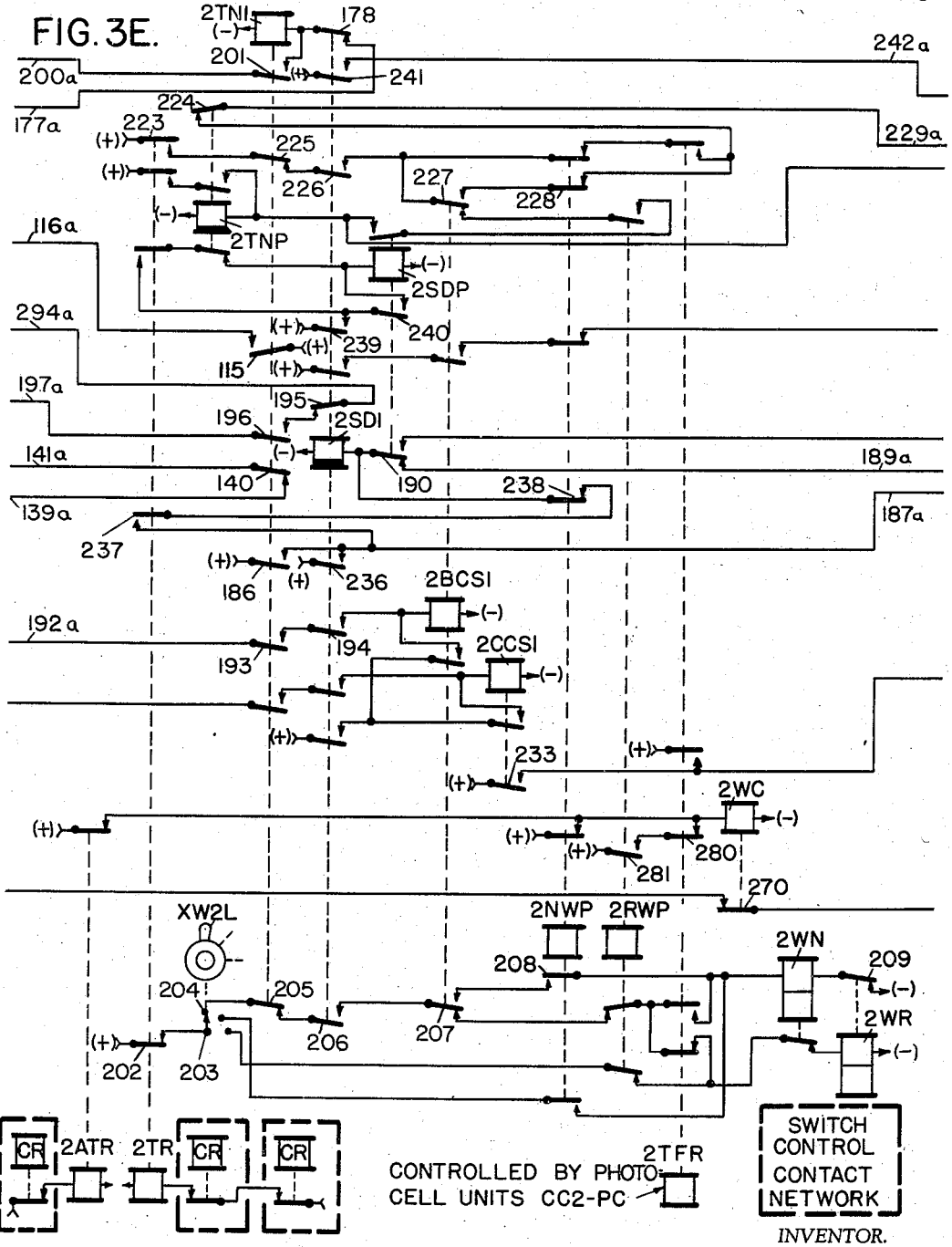

Figs. 3A through 3F when placed together show diagrammatically circuits for the control of the entrance portion of the conveyer, the storage and transfer of route descriptions, and for the control of the various means for actuating the entrance and exit switches over the conveyer as shown in Figs. 2A and 2B;

Fig. 4 shows diagrammatically the circuits for controlling the indicating lights associated with a conveyer exit switch;

Fig. 5 shows diagrammatically a typical photocell unit used for the detection of materials passing over the conveyer;

Figs. 6A–6J illustrate by a single line diagram the progress of three separate groups of materials over the conveyer system as illustrated in Figs. 2A and 2B;

Figs. 7A–7J show the sequences of relay operation when the three groups of materials shown in Figs. 6A–6J are moved over the conveyer; and Fig. 8 illustrates by block diagram the function of the respective entrance switches and the routing of respective switch controls through respective storage units.

For the purpose of simplifying the illustration and facilitating in the explanation, the various parts and circuits constituting the embodiment of the invention have been shown diagrammatically and certain conventional illustrations have been employed, the drawings have been made more with the purpose of making it easy to understand the principles and mode of operation, than with the idea of illustrating the specific construction and arrangement of parts that would be used in practice. Thus, the various relays and their contacts are illustrated in a conventional manner, and symbols are used to indicate connections to the terminals of batteries, or other sources of electric current, instead of showing all of the wiring connections to these terminals.

The symbols (+) and (—) are employed to indicate the positive and negative terminals respectively, of suitable batteries, or other sources of direct current; and the circuits with which these symbols are used always have current flowing in the same direction as indicated by the direction of the arrows. The symbol (F+) indicates connections to the positive terminal of a suitable battery or other direct current source through the contacts of a flasher or other interrupting means.

In one apparatus illustrating certain features of the invention as applied to a conveyer in an industrial plant which is assumed to transport materials from assembly lines for eventual routing to separate storage areas, there is provided three feed conveyers entering on the main transport conveyer through appropriate entrance switches, and four exit conveyers which conduct materials to separate loading platforms through appropriate exit switches leading from the main transport conveyer. There is also provided a manually operable control knob for each feed conveyer which is actuated to select any particular exit spur for a length of materials entering over a distinct feed conveyer.

The conveying equipment is provided according to usual practice in conveying systems of this character. The conveyer is assumed to be of the live roller type in which individual rollers are motor driven by belts, chains or other means. Conventional rotary table type conveyer switches are utilized for both the entrance and exit switches. The entrance and exit switches are operated by suitable power switch machines. Each conveyer switch has associated therewith a detector section comprising various banks of photocells for preventing the actuation of a particular conveyer switch when a group of materials is moving over it. The photocell detector sections also serve purposes to be made more readily apparent as the description progresses with respect to the transfer of route storages as respective groups of materials are moved over the exit portion of the conveyer. A photocell detection unit is provided a certain distance beyond the last entrance switch encountered by a group of materials for providing a detection means of the spacing of successive groups of materials on the transport conveyer. This photocell unit also serves purposes to be made more readily apparent as the description progresses with respect to the transfer of route storages as respective groups of materials progress over the transport portion of the conveyer. A photocell unit is positioned across the conveyer a certain distance in front of each exit switch to detect the approach of advancing material with respect to the operated position of the exit switch associated therewith. Other banks of photocell units are provided at each feed conveyer, and at the end of each exit conveyer, to detect the presence of materials for reasons which will become apparent as the description progresses.

Although photocell units are used in this disclosure, the detection of materials can be accomplished through the use of micro-switches which are actuated by conventional "floating rollers." It will also be noted in actual practice that the number of individual photocells employed can be reduced through the use of mirrors which permit light beams to criss-cross the conveyer a number of times. The present disclosure shows such an arrangement only once and assumes that any particular photoelectric circuit will be arranged to provide for the continuous detection of materials moving in any area.

With reference to Figs. 2A and 2B, the conveyor system for which this embodiment of the present invention is provided, is shown to have three feed conveyors FC1, FC2, and FC3 which are assumed to lead from various assembly lines in an industrial plant to the control portion of the present embodiment. The rollers in the feed conveyers FC1, FC2, and FC3 are assumed to be normally operating, thereby moving materials from left to right. The short assembly conveyers AC1, AC2, and AC3, which adjoin the feed conveyers, contain rollers which are normally at stop, thereby preventing materials from advancing beyond the end of the feed conveyers.

The entrance switches EW1 and EW2 are encountered by materials entering from the feed conveyers FC1, FC2, and FC3 respectively. When entrance switch EW2 assumes a normal position, and switch EW1 assumes a normal position, materials entering from FC1 can enter the main transport conveyer. Materials can enter the main transport conveyer from feed conveyer FC2 when switch EW1 is in a reverse position and switch EW2 is in a normal position. Materials entering from feed conveyer FC3 can enter the main transport conveyer portion when switch EW2 is in a reverse position. Upon the completion of a respective switch movement, the associated assembly conveyer is activated to permit a group of materials to move from left to right over the layout illustrated in Fig. 2A.

The three feed conveyers converge into a single main transport conveyer designated as MTC. The exit conveyer spurs SC1, SC2, SC3 and SC4 lead off the main transport conveyer, thereby providing means for conveying assembled lengths of materials to platforms P1, P2, P3 and P4, respectively, as shown in Fig. 2B.

The first exit switch encountered by a group of materials moving from a respective feed conveyer and over the main transport conveyer MTC switch is XW1. If switch XW1 is in a normal position according to a preselected description, the materials will advance to switch XW2. If switch XW2 is in a normal position, the group will advance to switch XW3. Assuming that switch XW3 is in a reverse position, the materials will move over spur conveyer SC3 which leads to the platform designated P3. It is apparent that if any of the aforementioned exit switches are in a reverse position, the particular group of materials will enter the particular spur conveyer associated with a respective exit switch.

The photocell units A1–PC, A2–PC and A3–PC detect the presence of materials occupying the feed conveyers FC1, FC2, and FC3, respectively. Photocell units EW1–PC and EW2–PC detect the presence of particular groups of materials being moved over respective associated entrance switch locations.

The photocell unit designated as CPC is provided to detect the passage of a group of materials over the main transport conveyer MTC. The photocell unit designated as APC1 detects the presence of a group of materials just prior to entering the exit switch XW1 and similarly photocell units APC2 and APC3 detect the presence of groups of materials approaching the exit switches XW2 and XW3, respectively. The photocell units XW1–PC, XW2–PC and XW3–PC detect the presence of materials being moved over the exit switches XW1, XW2 and XW3, respectively.

The photocell banks designated as CC1–PC through CC4–PC detect the presence of materials critically approaching the platform portions P1 through P4 of the spur conveyers SC1 through SC4, respectively, and provide for the deenergization of relays 1TR, 2TR, and 3TR, respectively, when any particular portion of the photocell unit associated therewith is occupied.

Photocell units APC1 through APC3 deenergize respective associated relays 1ATR through 3ATR when the particular photocell unit is interrupted, and the interruption of photocell unit CPC causes relay ZR to drop away. When photocell units CC1–PC through CC4–PC are interrupted, it is necessary that the entire bank of a respective photocell unit is completely interrupted before the relays 1TFR through 4TFR respectively are affected. The relays A1 through A3 associated with the photocell units A1–PC through A3–PC respectively are normally in a deenergized condition and pick up when an entire photocell unit is interrupted, thereby indicating that a respective feed conveyer contains an assembled length of materials.

A control station having an operator for controlling the destination of material moving over the feed conveyers FC1–FC3, respectively, is preferably located near the entrance portion of the conveying system but may be otherwise located if desired. Located at that control station is a suitable control panel such as the panel illustrated in Fig. 1 having control knobs, such as FCS–1, FCS–2 and FCS–3, for each feed conveyer leading onto the main transport conveyer. There are four indications associated with each of the knobs for selecting a particular exit spur. The designation P1 on a respective FCS control knob denotes the exit of a group of materials to platform P1; and the indications P2, P3, and P4 indicate the exit conveyer for each of the platforms similarly numbered.

Fig. 1 shows a plan view of a control panel for the conveyer system showing a geographic layout of the system. The lamps A1–TE, A2–TE, and A3–TE are illuminated in response to lengths of materials completely occupying the assembly areas of respective feed conveyers associated with particular lamps. The indicator lamps SC1–TE through SC4–TE are illuminated when lengths of materials critically occupy the space leading to respective loading platforms.

The control panel may also be furnished with switch position indicating lamps such as are designated in Fig. 1 such as NEE for indicating a normal switch position for entrance switches EW1 and EW2, and lamp REE for indicating a reverse position for switches EW1 and EW2. The lamps NWE and RWE indicate on the control panel a respective normal or reverse position for each of the associated exit switches.

The control panel as shown in Fig. 1 is also indicative of a suitable means provided for selectively determining whether or not the control of the conveyer exit switches is performed manually or automatically. The exit switch control levers XW1L, XW2L, and XW3L are provided for the manual operation of the respective exit switches XW1, XW2 and XW3. The levers XWL each have contained therein a suitable indicator lamp which is controlled according to circuits to be described so as to indicate positions of the associated conveyer switches; and these associated indicator lamps also indicate, by flashing energization, when respective exit conveyer switches fail to complete an operation before a group of materials reaches a respective APC photocell unit.

The respective switch levers XWL as illustrated in Fig. 1 are of the three position rotary type. The levers XWL when positioned in their left-hand position render a respective exit switch responsive to automatic controls. When lever XW1L is in its center position corresponding to the reverse position of switch XW1, the exit switch XW1 is operated to its reverse position, and when lever XW1L is in its right-hand position corresponding to the normal position of exit switch XW1, the switch is manually controlled to its normal position. The same mode of operation applies to switch XW3 and lever XW3L. However, lever XW2L causes the exit switch XW2 to be operated to its normal position when the lever is in its center position corresponding to the normal position of switch XW2, and the reverse position of switch XW2 is attained when the lever XW2L is in its right-hand position. The levers XWL are all shown in their left-hand positions wherein the lever handles point upward and are off the track diagram.

Fig. 4 shows an enlarged view of the manual control lever XW1L associated with switch XW1. Integral with the lever XW1L is a lamp 1TE which is so connected that when switch XW1 fails to complete a movement to a reverse or normal position the lamp 1TE gives off a flashing light indicating to the operator that a condition exists at switch XW1 which must be remedied. Lamp 1RWE gives off a steady light when switch XW1 is in a fully operated reverse position. Lamp 1NWE when switch XW1 is in a fully operated normal position. A similar arrangement is provided for switches XW2 and XW3.

Therefore, when a length of materials occupies the conveyer detector section controlled by photocell unit XW1-PC, relay 1TR drops away closing a circuit for lamp 1TE which extends from (+) including back contact 70 of relay 1TR and front contact 71 of a normally energized relay 1WC and lamp 1TE (—). A circuit for lamp 1RWE extends from (+) and includes front contact 72 of the switch repeater relay 1RWP which is energized when the switch XW1 is in a reverse position, to (—). The lamp 1NWE is illuminated by a circuit which extends from (+) and includes front contact 73 of relay 1NWP which is energized when the switch XW1 is in a normal position, to (—). The relays 1WC, 2WC and 3WC, whose function will be described in more detail as the description progresses are normally energized when switches XW1, XW2 and XW3 are in fully operated positions. Lamp 1TE gives off a flashing light when relay 1WC is deenergized, and it calls for a stopping of the conveyer because of conditions which will be explained in detail. The lamp relay 1LR is picked up by a circuit which extends from (+) and includes back contact 76 of relay 1WC, the winding of relay 1LR to (—) thereby closing a flashing circuit for the lamp 1TE which extends from (F+) and includes front contact 74 of relay 1LR and back contact 75 of relay 1WCR, to (—). A similar flashing light circuit is provided for the lamps 2TE and 3TE associated with the respective exit switches XW2 and XW3.

Fig. 5 shows a conventional photocell circuit which is employed in the previously mentioned photocell detection units in this conveyer system. As is apparent, the interruption of a light beam incident upon the photocell tube causes the relay associated therewith to drop away. As a photoelectric circuit is well known in the art, no further explanation is required.

The system control apparatus organization is illustrated by the block diagram of Fig. 8 as comprising a control for each of the entrance switches associated with each separate assembly conveyer. Switches EW1 and EW2 are represented by blocks which are divided into sections designated N and R, representing the normal and reverse positions of the switches. The control for automatically selecting routes for materials entering from particular feed conveyers is designated by the route selection apparatus which includes knobs FCS–1, FCS–2 and FCS–3. The route selection apparatus controls the setting up of route descriptions which are stored by the storage units XS; and each one of the XS storage units controls an associated exit switch XW. There is an extra storage unit 1XS2 associated with the control of the exit switch XW1 for reasons which are hereinafter described. Each of the storage units XS comprises a bank of storage relays CS, one storage relay being provided for each switch that a group of materials may encounter in a route from and including the switch associated with such storage unit. Thus, for the first two storage units 1XS2 and 1XS1, there are three CS description storage relays provided for each unit, this being the maximum possible number of conveyer switches which may be passed over by the moving materials in reaching a selected destination. These two storage units are distinctively activated in response to the selective energization of the control channels $a$, $b$, and $c$ which are responsive to the detected origins of entering materials and to the settings of respective route knob FCS on the operators control panel (see Fig. 1). These three control channels can be considered as being associated with the respective exit switches XW1, XW2, and XW3 of the conveyer layout of Fig. 2B. It is therefore provided that the channel $a$ is associated with the control of the conveyer switch XW1; the channel $b$ is associated with the control of switch XW2; the channel $c$ is associated with the control of switch XW3.

The entrance switches EW1 and EW2 are shown as being controlled by assembly conveyer AC1 through channels $z$ and $s$ leading from the control associated with conveyer AC1 to the normal N positions of switches EW1 and EW2 such normal positions being required for materials advancing from feed conveyer FC1. The respective EW1 and EW2 switch controls comprise approach relays A1—A3 which indicate total occupation of the assembly areas of feed conveyers FC1–FC3 respectively. Assembly repeater relays A1R—A3R are provided for selectively setting up routes for materials over the switches EW1 and EW2. There are also switch control relays E1WN and E1WR for controlling the movement of switch EW1, and similar relays E2WN and E2WR for controlling the movement of switch EW2. The relays E1NWP and E1RWP are provided to indicate the operated position of the switch EW1, and relays E2NWP and E2RWP are provided for indicating the operated position of switch EW2.

Relays AC1–MS to AC3–MS are provided for operating the assembly conveyers AC1 to AC3 respectively, thereby controlling the movement of materials from feed conveyers FC1 to FC3 respectively after the switches EW1 and EW2 are properly positioned.

Cut-off relays A1CO to A3CO are provided for controlling the movement of materials from FC1, FC2, and FC3, alternately, which function will be described in more detail as the description progresses.

As shown by the block diagram designated as Fig. 8, the channels leading to the route selection levers are connected to definite positions, N or R, of switches EW1 and EW2, to illustrate, for example, that when these two switches are in a normal position, the particular description determined by the position of lever FCS–1 is the description which is eventually stored in storage unit 1XS2. It can be seen that the lever FCS–2 is connected to the reverse position of switch EW1 and the normal position of switch EW2, so that the description determined by the position of knob FCS–2 will be the description set up in storage unit 1XS2 when the entrance switch EW1 assumes a reverse position and entrance switch EW2 assumes a normal position. The control for switch EW2, which admits materials from feed conveyer FC3, has one channel $v$ leading to the reverse position of switch EW2, because switch EW2 is the only switch that will be encountered by materials from feed conveyer FC3 which enter the main transport section of the conveyer. Thus it can be seen that the route description for materials entering from the various feed conveyers is set up in accordance with the positions of the various respective FCS route control knobs, and depends upon the actual positions of the entrance switches.

The route selection apparatus comprises route selection relays 1LC, 2LC, 3LC and 4LC for selectively energizing the appropriate description storage relays CS associated with the storage unit 1XS2. A route selection stick relay LCS provides stick energy for the respective LC relays, and a route selection storage relay SDLC provides a means for maintaining a respective LC relay energized until the description is transferred to the storage unit 1XS2.

The storage unit 1XS1, comprising code storage relays 1ACS1, 1BCS1 and 1CCS1 (see Figs. 3D and 3E) and suitable switch control relays 1WN, 1WR, 1NWP, 1RWP and 1TFR are provided for directly governing and indicating the operation of conveyer switch XW1, in accordance with the route description stored by the storage bank 1XS1. The storage bank 1XS2, comprising description storage relays 1ACS2, 1BCS2 and 1CCS2, are provided as a means for storing an additional route description which may be set up before a route description stored in the storage unit 1XS1 is transferred to 2XS1 in response to the movement of the group of materials for which the route description in 1XS1 has been stored. It will be readily apparent that the number of storages to be provided initially is arbitrary and dependent upon the space provided for individual groups of materials between the photocell detection unit CPC and the photocell detection unit XW1 PC associated with the first exit switch to be encountered. The present disclosure assumes that there is space for two groups of materials between photocell units CPC and XW1-PC.

It can be pointed out that the space between successive exit switches may also be great enough to require a plurality of route description storage means. In other words, the number of storage means between successive conveyor switch locations should be equal to the maximum number of distinct groups of materials which can be spaced between the detecting photocell units associated with successive switches.

It will be noted according to Fig. 8 that there are only two control channels carrying the route descriptions to the storage units associated with the switch XW2 because at this particular point along the route extending from the main transport conveyer, the control for the exit switch XW1 has already been executed and thus the switch control channel $a$ is no longer required. It follows that the route description carried into the next storage 3XS1 requires only one channel $c$ instead of two.

In the present embodiment, there is shown only one storage unit associated with each of the successive switches with the exception of the first switch XW1 to be encountered by materials after leaving the main transport conveyer.

Fig. 2C shows the code chart for the energizing of the code storage relays CS for a particular route description. The energized condition of a CS relay calls for the normal position of a respective switch, and the deenergized condition of a CS relay calls for the reverse position of a respective switch. The energizing of a particular CS relay energizes an associated control channel (see Fig. 8). According to the chart, for example, a route set up for spur conveyer SC3 would involve the energizing of channels $a$ and $b$. The channel $c$ is deenergized because it calls for the reverse positioning of switch XW3. A route set up for spur conveyer SC1 calls for the deenergization of channel $a$ because the called for position of switch XW1 is reverse. The channels $b$ and $c$ are deenergized because the switches XW2 and XW3 are not included in the route.

Associated with each of the storage units XS as illustrated in Fig. 8 are suitable storage detection relays SD, transfer relays TN, relays SDP and relays TNP. The storage detection relays SD and the relays TNP are made slow acting for purposes to be described when considering the specific mode of operation of the system and from reference to the sequence charts of Figs. 7A–7J.

Having considered the general organization of apparatus provided in the conveyor control system for one embodiment of the present invention, more specific consideration of the system will now be given with reference to the mode of operation under typical operating conditions.

*Operation*

Before considering specifically the respective circuits involved, a brief consideration will be given to the mode of operation of the system with reference to the block diagram of Fig. 8. As indicated by the block diagram the position of the knob FCS-1 on the operator's panel (see Fig. 1) determines the character of a route description to be set up for materials entering from feed conveyer FC1. When a full length of materials is detected in the assembly portion of conveyer FC1 the control chanels $z$ and $s$ are energized to bring switches EW1 and EW2 to a normal position. The positioning of the switches, as designated by channels $z$ and $s$, conditions the lever FCS-1 for effecting the setting up of a description for routing materials from conveyer FC1 to the platform corresponding to the position designated on the control lever FCS-1. Assuming that the knob FCS-1 is turned to the designation P4, a route description is then set up for materials leaving FC1 to route such materials to platform P4. After the entrance switches are properly positioned, the assembly conveyer AC1 is activated causing the assembled materials on feed conveyer FC1 to move onto the transport conveyer MTC. When the length of materials reaches and occupies the area governed by the photocell bank CPC (see Fig. 2A) the route description is transferred to storage unit 1XS2 with channels $a$, $b$ and $c$ all being energized. When the group of materials leaves the photocell bank CPC, the stored description in 1XS2 is transferred to 1XS1. Energy is now applied to the control apparatus for switch XW1, operating the switch to its normal position if it is not already in that position. If at the time of the transfer of the description from unit 1XS2 to unit 1XS1, channel $a$ had not been energized, the switch XW1 would be operated to its reverse position, thereby routing the particular group of materials over spur conveyer SC1 to platform P1.

After the switch XW1 has been positioned in accordance with the description stored by the storage unit 1XS1, there is no further operation of the system, in so far as the transferring of the description to other storage units is concerned until the materials associated with the description enter the area around exit switch XW1 and are detected by the photocell bank XW1-PC. When the photocell bank XW1-PC is occupied, a transfer is effected to storage units 2XS1, if no other group of materials is occupying the area governed by photocells XW2-PC at the time. The switch XW2 is operated in accordance with the energized or deenergized condition of channel $b$. Assuming that the materials are to be routed to platform P4, wire $b$ is energized, thereby operating switch XW2 to its normal position. When a length of materials is detected by the photocell unit associated with switch XW1, the description is transferred, thereby permitting the introduction of another description into storage unit 1XS1. When materials which are destined for platform P1 are detected by the photocell detection unit XW1-PC, the description for these materials is transferred. However, the description is, in effect, cancelled so that a new description for a succeeding length of materials can be transferred into storage unit 1XS1 while the materials which are destined for platform P1 still occupy the switch XW1.

When the length of materials is detected by the photocell detecting unit XW2-PC at switch XW2, the description stored in storage unit 2XS1 is transferred to unit 3XS1, and the normal position of switch XW3 is called for, because of the energization of channel $c$.

When the length of materials leaves the photocell banks associated with switch 2XS1, the description stored previously in 2XS1 is transferred, and the unit is ready for another route description. Because of the fact that XW3 is the last switch to be encountered, a new description can be stored in the storage unit 3XS1 after the respective length of materials enter, and before the materials leave the photocell detecting section 3XS1, regardless of the called-for position of switch XW3, because switch XW3 is the last switch to be encountered.

Having thus considered the general mode of operation of the conveyer system with particular reference to the setting up of a particular destination for a particular feed conveyer, it will be readily apparent that the mode of operation which has been described is typical of the mode of operation that would be provided for the movement of materials from other feed conveyers over the main transport conveyer to other platform destinations.

The approach control

Assuming that the operator wishes to convey a group of materials from feed conveyer FC2 to spur conveyer SC3, the knob FCS-2 (see Fig. 1) is positioned until the pointer thereon is in line with the designation P3. A CR relay is deenergized when the photo-electric circuit as shown in Fig. 5 is interrupted. When a length of materials has been assembled on feed conveyer FC2 thereby completely occupying the area governed by the photocell unit A2–PC all of the CR relays associated therewith are deenergized with the exception of the CR relay associated with the last photocell unit. In response to this condition, the relay A2 is energized by a pick-up circuit (see Fig. 3A) extending from (+) and including back contact 21, back contact 22, back contact 23, and back contact 24, of the relays CR which are controlled by photocell unit A2–PC, and the winding of relay A2 to (−). Relay A2 is held energized by a stick circuit extending from (+) and including the back contact 26 of the last relay in the photocell unit A2–PC, the front contact 27 of relay A2, to (−). This stick circuit holds relay A2 energized until the length of materials completely vacates the area governed by the photocell bank A2–PC.

When relay A2 is energized a pick-up circuit is closed for relay A2R extending from (+), and including front contact 28 of relay A2, back contact 29 of relay A2CO, the upper winding of relay A2R, the back contact 30 of relay RS, and front contact 31 of relay ZR, to (−). Similar pick-up circuits for relays A1 and A3, and A1R and A3R, respectively, are provided as shown in Fig. 3A.

As previously described the movement of materials from feed conveyer FC2 requires the reverse positioning of switch EW1 and the normal positioning for switch EW2, thus, pick-up circuits responsive to relay A2R are provided to energize the switch control relays E1WR and E2WN which control the reverse positioning of switch EW1 and the normal positioning of switch EW2. The pick-up circuit for relay E1WR extends from (+), and includes front contact 32 of the normally energized relay E1–TR, back contact 33 of relay A3R, the front contact 34 of relay A2R, back contact 35 of relay A1R, back contact 36 of relay 1RWP, the upper winding of relay E1WR, and back contact 37 of relay E1WN, to (−). The pick-up circuit for relay E2WN extends from (+), including the front contact 38 of the normally energized relay E2–TR, the back contact 39 of relay A3R, the front contact 40 of relay A2R, the back contact 41 of relay E2NWP, the back contact 42 of relay E2WR, and the upper winding of relay E2WN, to (−). It is apparent from the previous pick-up circuits that the relay A2R must be energized while relays A1R and A3R must be in a deenergized condition before a circuit is completed to the E1WR and E2WN relays. It is also apparent that relays E1–TR and E2–TR which are controlled by the photocell units EW1–PC and EW2–PC must be in a normally energized condition before the switches EW1 and EW2 can be moved. In other words, the detector sections covered by photocell units EW1–PC and EW2–PC must be vacant.

The switch repeater relays E1NWP, E1RWP, E2NWP, and E2RWP are controlled by the limit switches on the particular switch table associated with the respective relays. That is, relay E1RWP will not become energized until the switch EW1 is in a full reverse position. Relay E2NWP will not become energized until relay E2WN is in a full normal position. Similar modes of operation apply to the other switch repeater relays.

A well known type limit switch is associated with the particular entrance and exit switch control relays which controls a stick circuit for the particular EW relay in the case of the entrance switches and appropriate W relays in the case of the exit switches. Preferably these limit switches have a constant wiping contact which prevents a respective switch control relay from becoming deenergized until the switch has reached a fully operated position.

The stick circuit for the switch control relay E1WR extends from (+) and includes the contact 43 of the limit switch associated with switch table EW1, front contact 44 and the lower winding of relay E1WR, to (−). This stick circuit is necessary to insure the full positioning of the switch EW1 to its reverse position. Similar stick circuits are provided for relays E1WN, E2WN, and E2WR which is apparent from Fig. 3B. The stick circuit for E1WN extends from (+), including the contact 45 of the limit switch on switch table EW1, the front contact 46 of relay E1WN and the lower winding of relay E1WN, to (−). The stick circuit for E2WN extends from (+), including the contact 47 of the limit switch associated with switch table EW2, the front contact 48 of relay E2WN and the lower winding of E2WN, to (−). The stick circuit for E2WR extends from (+), including contact 49 of the limit switch associated with switch table EW2, front contact 50, and the lower winding of E2WR, to (−).

The switch control relay EWN and EWR each have two independent windings for the purpose of isolating the stick circuits from the pick-up circuits. Since the stick circuits are dependent upon the completion of switch movements, a control relay will remain energized to maintain switch controls to completion.

The conveyer rollers on which the materials are conveyed within the respective feed conveyers are normally moving, while the rollers comprising the assembly conveyers AC1, AC2 and AC3 (see Fig. 2A) are normally at rest. This condition exists so that the materials arriving from the assembly line can move up into the assembly conveyers but will move no farther until the appropriate assembly conveyer rollers are activated by an appropriate drive motor. Up to this point no circuit has been completed which will energize the drive motor associated with assembly conveyer FC2. This motor is not shown, but its control circuit is indicated in Fig. 3A. The control circuit is responsive to relay AC2–MS, and this relay cannot be picked up until switch EW1 is in a reverse position and switch EW2 is in a normal position. The pick-up circuit for relay AC2–MS extends from (+), including the front contact 51 of relay A2R, the front contact 52 of relay E2NWP, the front contact 53 of relay E1RWP, the front contact 54 of relay A2, and the winding of AC2–MS, to (−). As has been previously shown relay A2 is held energized by an appropriate stick circuit until the last portion of the group of materials leaves the area governed by photocell bank A2–PC. Therefore, when relay A2 is deenergized relay AC2–MS is deenergized which shuts off the power to drive motor AC2.

When the switch repeater relay E1RWP is energized and repeater relay E2NWP is energized, a pick-up circuit is completed for cut-off relay A2CO. This pick-up circuit extends from (+) including the front contact 55 of relay A2R, front contact 56 of relay E1RWP, front contact 57 of relay E2NWP, the winding of relay A2CO, and back contact 58 of the cut-off repeater relay COP to (−). When the relay A2CO is energized it is held by a stick circuit extending from (+) including the front contact 55 of A2R, the front contact 59 of relay A2CO, the winding of A2CO, and the back contact 58 of relay COP to (—). There is an alternate stick circuit for relay A2CO which extends from (+) including either the front contact 60 of relay A1, or from (+) including the front contact 61 of relay A3, the front contact 62 of relay A2CO, the winding of relay A2CO, the back contact 58 of relay COP to (—). These stick circuits are provided so that the relay A2CO will remain energized when either relay A1 or A3 is energized regardless of the position of the entrance switches. At this point it should be noted that the previously described pick-up circuit for relay A2R cannot be reclosed until the back contact 29 of relay A2CO is again closed.

Likewise, relay A1CO will remain in an energized condition as long as relays A2 or A3 are energized. Relay A3CO will remain energized as long as relays A1 and A2 are energized. Thus, relay A1R cannot be energized when A1CO is energized, because the pick-up circuit which extends from (+) including the front contact 63 of relay A1, the back contact 64 of relay A1CO, the winding of relay A1R, the back contact 30 of relay RS, and the front contact 31 of relay ZR to (—), is open at the back contact 64 of relay A1CO. And relay A1CO will remain energized as long as there is a length of materials waiting on feed conveyer FC2 or FC3, because the stick circuit for A1CO will be completed from (+) through the front contacts 65 or 66 of relay A2 or A3. The same is true of relay A2CO with respect to the condition of relays A1 or A3 because of the closing of the front contacts 60 or 61 respectively, and also relay A3CO is held energized as long as either relay A1 or A2 is energized. This prevents succeeding lengths of materials from moving, for example, from conveyer FC1 when there are materials waiting to be moved from FC2 or FC3. In other words the materials will be moved in a predetermined sequence from respective feed conveyers as long as there are materials to be conveyed. The relay COP is energized by the closing of its pick-up circuit extending from (+) including the front contact 67 of A1CO, the front contact 68 of A2CO and the front contact 69 of A3CO, through the winding of COP to (—). Thus, when materials have entered from all of the feed conveyers, relay COP will become energized thereby breaking the stick circuit for all of the ACO relays by the opening of the back contact 58 of relay COP. At this point the ACO relays are all deenergized, thereby permitting the described cycle of operation to be repeated, or in other words, permitting the ACO relays to become successively energized by the sequential movement of materials from the three feed conveyers in sequence.

As shown in Fig. 3A, the A3R relay has a normal pick-up time, the A2R has a slower pick-up time, and the A1R relay is the slowest in picking up. This arrangement provides a definite preference for a respective feed conveyer, or in other words, assuming that materials had been conveyed from feed conveyer FC1, and more materials were fully assembled and waiting on feed conveyers FC1, FC2 and FC3, the materials will not move from FC1 because of the previously described sequential feature, and the materials will definitely move from feed conveyer FC3 before FC2 because the pick-up speed for relay A3R is faster than relay A2R.

When the materials move out of feed conveyer FC2, over conveyer AC2 from feed conveyer FC2 and into the area covered by the photocell unit EW2-PC, the relay E2-TR is deenergized by opening its energizing circuit which extends from (+) including series-connected front contacts such as 101 of the CR relays in the photocell unit EW2-PC, through the winding of relay E2-TR to (—). When the relay E2-TR is deenergized, the pick-up circuit for relays E2WN and E2WR are interrupted at the front contact 38 of relay E2-TR thereby preventing the movement of the entrance switches while a group of materials is about to pass or is passing over the switch table EW2. When the length of materials leaves the area covered by the photocell unit EW2-PC, relay E2-TR is again energized by the reenergization of the series connected relays CR in the photocell bank. The same conditions exist with respect to the pick-up circuit for switch control relays E1WN and E1WR when a group of materials is passing over switch table EW1.

Assuming that the control knob FCS-2 had been turned to the indicated position P3 as previously mentioned, and that the switch repeater relay E1RWP was energized denoting that the switch EW1 is in a reverse position and relay E2NWP was energized which is indicative of switch EW2 being in a normal position, a pick-up circuit for the route selection control relay 3LC (see Figs. 3A-3C) is completed when the materials from FC2 enter the area governed by the photocell unit CPC. If the knob FCS-2 had been turned to either position P1 or P2 the relay 1LC or 2LC, respectively, would have been energized by a respective pick-up circuit similar to the pick-up circuit for relay 3LC. The pick-up circuit for relay 3LC extends from (+), including the back contact 80 of relay 1TN2, the back contact 81 of relay LCS, wire 82a, front contact 83 of relay E1RWP, front contact 84 of relay E2NWP, back contact 85 of relay ZR, wire 86a, center contact 87 and the designator contact 88 of lever FCS-2, and the upper winding of relay 3LC, to (—). A similar circuit is provided for knob FCS-1 which necessitates the normal position of both switches EW1 and EW2 because of the front contacts 102 of relay E1NWP and front contact 103 of relay E2NWP, is included in the energizing circuit. The same is true for lever FCS-3 which includes front contact 89 of relay E2RWP in its selection circuit. Thus, at this point in the circuit it can be seen that the position of the entrance switches determines which particular FCS knob will set up a designated route description.

If knob FCS-1 is in position to call for materials from conveyer FC1 to be routed to spur conveyer SC1, and relay ZR is dropped away, a pick-up circuit is completed for selection control relay 1LC from (+), including back contact 80 of relay 1TN2, back contact 81 of relay LCS, wire 82a, front contact 102 of relay E1NWP, front contact 103 of E2NWP, back contact 90 of relay ZR, center contact 91 of knob FCS-1, point contact 92, and upper winding of relay 1LC, to (—). It is noted at this point that if the switches were not both in a normal position but if switch EW1 was in a reverse position and EW2 was in a normal position the route selection for FCS-2 energizes a particular LC relay according to its designation because front contact 83 of relay E1RWP and front contact 84 of relay E2NWP would be closed. Front contact 102 of E1NWP would be open which would prevent the completing of a pick-up circuit for any of the LC relays. The same is true regarding the reverse position of switch EW2 because the pick-up circuit for any of the LC relays running through FCS-3 would not be completed because front contact 89 of relay E2RWP is open; therefore, a pick-up circuit could not be completed which would of necessity extend from (+), including a back contact 80 of relay 1TN2, back contact 81 of relay LCS, wire 82a, front contact 89 of relay E2RWP, back contact 93 of relay ZR, wire 94a, the center contact 95 of lever FCS-3, indicator contact 96, 97, 98, or 99 on the lever FCS-3 to any of the upper windings of the LC relays.

In summary, it is apparent that the positions of the entrance switches selectively determines which knob is to be effective, and the position of the selection knob determines which LC relay is to be operated, thereby determining the character of the route description to be set up in the system.

Transfer of route description

Assuming that the control knob FCS-2 is positioned to designation P3, and that a length of materials is moving from feed conveyer FC2 onto the main transport conveyer, the route selection relay 3LC is picked up in response to the deenergizing of relay ZR which occurs when the length of materials interrupts photocell unit CPC.

The relay 3LC is energized by a pick-up circuit extending from (+), and including back contact 80 of transfer relay 1TN2, back contact 81 of stick relay LCS, wire 82a, front contact 83 of relay E1RWP, front contact 84 of relay E2NWP, back contact 85 of relay ZR, center contact 87, designator contact 88 of knob FC2-S, and the upper winding of 3LC, to (—).

When relay 3LC is energized, a stick circuit is completed which extends from (+), and includes front contact 110 of the normally energized storage detection relay SDLC, the winding of relay LCS, the back contact 111 of relay 4LC, the front contact 112 of relay 3LC, and the lower winding of relay 3LC, to (—). The closing of this stick circuit for relay 3LC energizes relay LCS by the pick-up circuit extending from (+), and including the front contact 110 of relay SDLC, the winding of relay LCS, the back contact 111 of relay 4LC, the front contact 112 of relay 3LC, to (—). When relay LCS is energized, the transfer relay 1TN2 is energized by a pick-up circuit extending from (+), and including the front contact 113 of relay LCS, the back contact 114 of the storage detection relay 1SD2, the winding of relay 1TN2, to (—). In response to the picking up of relay LCS, the pick-up circuit for relay 3LC is interrupted at back contact 81 of relay LCS. Relay 1TN2 keeps the pick-up circuit for relay 3LC interrupted at back contact 80 of relay 1TN2 until the description is advanced into storage unit 1XS2 (Fig. 8). The energizing of relay 1TN2 results in the picking up of the storage detection relay 1SD2 by pick-up circuit extending from (+), including the front contact 115 of relay 1TN2, wire 116a, back contact 117 of relay 1TN1, wire 118a, and the winding of relay 1SD2, to (—). When the relay 1SD2 is picked up, the code storage relay 1ACS2 is energized by a pick-up circuit extending from (+), and including front contact 119 of relay 3LC, front contact 120 of relay 1TN2, front contact 121 of relay 1SD2, and the winding of relay 1ACS2, to (—); and relay 1BCS2 is energized by a pick-up circuit extending from (+), including front contact 122 of relay 3LC, front contact 123 of relay 1TN2, front contact 124 of relay 1SD2, and the winding of relay 1BCS2, to (—). The code storage relays which are energized, are held in an energized condition by stick circuits extending from and including the front contact 125 of relay 1SD2 and the front contact 126 of 1BCS2 for relay 1BCS2; and front contact 127 for relay 1ACS2. The stick circuits are provided so that the appropriate code storage relays will remain energized as long as the storage detection relay is energized. After relay 1SD2 is picked up and relay 1TN2 is down, the relay SDLC is deenergized by the opening of back contact 128 of relay 1SD2 and back contact 132 of relay 1TN2. The deenergizing of relay SDLC causes its front contact 110 to open, thereby breaking the stick circuit for the 3LC relay. Simultaneously, relay LCS is deenergized which opens one of the stick circuits for relay 1TN2 at the front contact 113 of relay LCS. Relay SDLC is made slow acting to insure the transfer of the description from a respective selection control LC relay to the code storage relays associated with storage unit 1XS2. At this point a description is completely stored in storage unit 1XS2.

When the group of materials leaves the photocell unit CPC, the relay ZR is again energized. The other stick circuit for 1TN2 which extends from (+) and including back contact 129 of relay ZR, wire 130a, front contact 131 of relay 1TN2, the winding of relay 1TN2, to (—), is opened at the back contact 129 of relay ZR. Relay 1TN2 then drops away opening its front contacts such as 120 and 123, thereby opening the earlier described pick up circuits for the CS relays. The closing of back contact 132 of relay 1TN2 causes the picking up of relay SDLC. The closing of back contact 80 of relay 1TN2 restores energy to the previously described pick-up circuits for relays 1LC—4LC. At this time another description can be set up and stored by the LC relays when a succeeding group of materials interrupts the photocell bank CPC.

The dropping away of relay 1TN2 closes a pick-up circuit for relay 1TN1 extending from (+), and includes the back contact 133 of relay 1TN2, the front contact 134 of relay 1SD2, wire 135a, the back contact 136 of relay 1SD1, the winding of relay 1TN1, to (—). It should be noted at this point that the relay 1TN1 will not pick up if there is a previous description in storage unit 1XS1 because of the inclusion of back contact 136 of relay 1SD1 in the pick-up circuit. Also, a description will not be transferred unless there is a description stored in storage unit 1XS2 because of the inclusion of the front contact 134 of relay 1SD2 in the pick-up circuit for 1TN1.

When relay 1TN1 is energized, it is held in an energized condition by a stick circuit which extends from (+), and includes back contact 133 of relay 1TN2, front contact 134 of relay 1SD2, wire 135a, and front contact 137 of relay 1TN1, to (—). When relay 1TN1 is energized storage detection relay 1SD1 becomes energized by a pick-up circuit extending from (+), and including front contact 138 of relay 1TN1, wire 139a, back contact 140 of relay 2TN1, wire 141a, back contact 142 of relay 1SDP, and the winding of 1SD1, to (—). At this point the code storage relay 1ACS1 is energized by a pick-up circuit extending from (+), and including front contact 143 of relay 1ACS2, wire 144a, front contact 145 of relay 1TN1, front contact 146 of relay 1SD1, and winding of relay 1ACS1, to (—). Relay 1BCS1 is also energized by a pick-up circuit extending from (+), including the front contact 147 of relay 1BCS2, wire 148a, front contact 149 of relay 1TN1, front contact 150 of relay 1SD1, winding of relay 1BCS1, to (—).

When relay 1SD1 is picked up, the stick circuit for relay 1SD2 which extends from (+) and includes front contact 151 of relay 1SD2, wire 152a, back contact 153 of relay 1SD1, wire 118a, to (—) is interrupted at back contact 153 of relay 1SD1, thereby causing relay 1SD2 to drop away. Relay 1SD2 is made slow releasing to insure the complete transfer of the description to the code storage relays 1CS1.

At this point it should be noted that the description stored in storage unit 1XS2 has been completely transferred to storage unit 1XS1, thereby permitting a new description storage to be introduced into storage unit 1XS2 due to the fact that relay 1SD2 dropped away thereby closing back contact 114 which makes it possible to pick up transfer relay 1TN2. The deenergizing of relay 1SD2 also breaks the stick circuit for the description storage relays 1ACS2 and 1BCS2 by the opening of front contact 125 of relay 1SD2.

At this time the description for the materials to be routed to spur conveyer SC3 is completely stored in the storage unit 1XS1. Now the switch XW1 will be operated to a normal position when the length of materials leaves detection section CPC. Specifically, when the code storage relay 1ACS1 is energized and switch repeater relay 1NWP is down, a pick-up circuit is completed for the relay 1WN which controls the movement of the switch XW1 to a normal position, which extends from (+), and includes front contact 154 of the normally energized relay 1TR, contact 155 of the manually controlled lever XW1L in its left-hand position, back contact 156 of relay 1TN1, front contact 157 of relay 1SD1, front contact 158 of relay 1ACS1, back contact 159 of the repeater relay 1NWP, upper winding of relay 1WN, and back contact 160 of relay 1WR, to (—). If the route had called for an exit over spur conveyer SC1, the code storage relay 1ACS1 would have been deenergized, thereby completing a pick-up circuit for relay 1WR when relay 1RWP is deenergized, which controls the movement of switch XW1 to a reverse position, which pick-up circuit extends from (+), including front contact 154 of relay 1TR, contact 155 of lever XW1L, back contact 156 of relay 1TN1, front contact 157 of relay 1SD1, back contact 161 of relay 1ACS1, back contact 162 of relay 1RWP, front contact 163 of relay 1TFR, back contact 164 of relay 1WN, and the upper winding of relay 1WR, to (—).

When the switch XW1 reaches the normal position nothing further occurs with respect to storage unit 1XS1 until the group of materials enters the detector section governed by photocell unit XW1–PC (see Fig. 2B).

When the group of materials associated with the description stored in storage unit 1XS1 interrupts the photocell detection unit XW1–PC, a normally energized relay 1TR is deenergized which opens any possible pick-up circuit for the switch control relays 1WN and 1WR by the opening of the front contact 154 of relay 1TR thereby preventing the manual or automatic operation of conveyer switch XW1 while a group of materials is within the detector section controlled by photocell unit XW1–PC. Simultaneously, a stick circuit for relay 1SD1 is closed which extends from (+), including front contact 165 of relay 1SD1, back contact 166 of relay 1TR, front contact 167 of relay 1NWP, and the winding of relay 1SD1, to (—), thereby preventing the description stored in storage unit 1XS1 from being cancelled while a group of materials occupies this detector section and switch XW1 is normal. Simultaneously, a pick-up circuit is completed for relay 1SDP which extends from (+), and includes front contact 168 of relay 1SD1, back contact 169 of relay 1TR, back contact 170 of relay 1TNP, and the winding of relay 1SDP, to (—). When the relay 1TR is dropped away a pick-up circuit for relay 2TN1 is completed which extends from (+), including back contact 171 of relay 1TR, back contact 173 of relay 1TN1, front contact 174 of relay 1SD1, front contact 175 of relay 1ACS1, front contact 176 of relay 1NWP, back contact 172 of relay 1TNP, wire 177a, back contact 178 of relay 2SD1 and the winding of relay 2TN1, to (—).

It should be noted at this point that the called-for position of switch XW1 is normal, thereby dictating that a destination to a spur conveyer other than spur conveyer SC1 is required, which requires the transfer of the stored description to the storage unit 2XS1. However, if the switch XW1 had been called to a reverse position, the previously described pick-up circuit for relay 2TN1 could not have been completed, because the front contact 175 of description storage relay 1ACS1 would be open. The only other possible pick-up circuit for relay 2TN1 available extends from (+), and includes back contact 171 of relay 1TR, back contact 173 of relay 1TN1, front contact 174 of relay 1SD1, front contact 179 of relay 1NWP, back contact 180 of relay 1TFR, back contact 172 of relay 1TNP, wire 177a, back contact 178 of relay 2DS1, to (—). The function of relay 1TFR, the deenergization of which would complete this alternate pick-up circuit, will be described in detail in a separate paragraph.

At this point it is appropriate to describe the function of the storage detection repeater relays SDP and the transfer repeater relays TNP. When the storage detection relay 1SD1 is energized and materials enter the area covered by photocell unit XW1–PC the relay 1SDP is picked up by a circuit extending from (+), including front contact 168 of relay 1SD1, back contact 169 of relay 1TR, back contact 170 of relay 1TNP, and the winding of relay 1SDP, to (—). The energizing of the 1SDP relay closes its front contact 198 which opens a stick circuit provided for relay 1SD1 when switch XW1 is in a reverse position and the stored description is not transferred to the succeeding switch storage unit 2XS1. When relay 1SD1 drops away, a new description can be stored in storage unit 1XS1 while the photocell bank XW1–PC is occupied by materials moving onto exit conveyer SC1 over the reverse position of switch XW1.

When switch XW1 is in a normal position and the description stored in storage unit 1XS1 is transferred to storage unit 2XS1 as indicated by the energized condition of relay 2TN1, relay 1TNP is energized by a pick-up circuit extending from (+) and including front contact 115 of relay 2TN1, wire 116a, and the winding of relay 1TNP to (—). The energizing of relay 1TNP opens its back contact 172 in the pick-up circuit for relay 2TN1 thereby permitting only one description to be transferred for each length of materials.

With switch XW1 in a reverse position and relay 1ACS1 deenergized, the picking up of relay 1SDP closes a pick-up circuit for relay 1TNP which extends from (+), including back contact 171 of relay 1TR, back contact 173 of relay 1TN1, front contact 174 of relay 1SD1, back contact 181 of relay 1ACS1, front contact 182 of relay 1RWP, front contact 183 of relay 1SDP, winding of relay 1TNP, to (—). The relay 1TNP would be held up by a stick circuit extending from (+), including back contact 184 of relay 1TR, front contact 185 of relay 1TNP, the winding of relay 1TNP, to (—), until the detector section becomes vacant. The energizing of this relay opens the pick-up circuit for transfer relay 2TN1 at back contact 172 of relay 1TNP, thereby preventing the transfer of a new route description to storage unit 2XS1 while the detector section XW1–PC is occupied. The relay 1TNP is deenergized when the materials leave the photocell unit XW1–PC by opening the previously described stick circuit at back contact 184 of relay 1TR. Therefore, the succeeding length of materials can transfer the new description previously stored in unit 1XS1.

As previously mentioned, relay 2TN1 was energized when the group of materials entered the detector section XW1–PC. The energizing of relay 2TN1 results in the picking up of relay 2SD1 by a pick-up circuit extending from (+), including front contact 186 of relay 2TN1, wire 187a, back contact 188 of relay 3TN1, wire 189a, back contact 190 of relay 2SDP, and the winding of relay 2SD1, to (—). When relay 2SD1 picks up, the code storage relay 2BCS1 is energized by a pick-up circuit extending from (+), including front contact 191 of relay 1BCS1, wire 192a, front contacts 193 and 194 of relays 2TN1 and 2SD1 respectively, and the winding of relay 2BCS1, to (—). The relay 2CCS1 is not picked up because the destination for this particular group of materials calls for a reverse position of conveyer switch XW3 which requires that the relay 2CCS1 be deenergized.

When the materials leave the aforementioned photocell detection unit, the relay 1TR is energized which results in the opening of the stick circuit for relay 1SP1 at back contact 166 of relay 1TR. The dropping away of relay 1SD1 closes its back contact 136 in the pick-up circuit for relay 1TN1, thereby permitting a new description to be stored in storage unit 1XS1. It is apparent that the alternate stick circuit for relay 1SD1 which extends from (+) includes front contact 291 of relay 1SD1, front contact 292 of relay 1ACS1, front contact 293 of relay 1NWP, wire 294a, back contact 195 of relay 2SD1, front contact 196 of relay 2TN1, wire 197a, front contact 198 of relay 1SDP, winding of relay 1SD1, to (—), is rendered ineffective after the description is stored in unit 2XS1 because the back contact 195 of relay 2SD1 is open.

After relay 1SD1 drops away, the stick circuit for relay 2TN1 is opened at front contact 199 of relay 1SD1. The stick circuit for relay 2TN1 extends from (+), including front contact 199 of relay 1SD1, wire 200a, front contact 201 of relay 2TN1, winding of relay 2TN1, to (—).

The dropping away of relay 2TN1 permits the switch XW2 to be moved to a normal position, assuming that it was previously operated to a reverse position. The pick-up circuit for relay 2WN which moves switch XW2 to a normal position extends from (+), including front contact 292 of the relay 2TR, center contact 293 of lever XW2L, contact 204 of lever XW2L in its left-hand position, back contact 205 of relay 2TN1, front contact 206 of relay 2SD1, front contact 207 of relay 2BCS1, back contact 208 of relay 2NWP, upper winding of relay 2WN, and back contact 209 of relay 2WR, to (−).

Simultaneously with the deenergization of relay 1SD1 the code storage relay 1BCS1 is deenergized and the relay 1SDP is deenergized thereby permitting another description to be stored in storage unit 1XS1. The code storage relay 1BCS1 is dropped away by the opening of its stick circuit at front contact 220 of relay 1SD1, which stick circuit extends from (+) and includes front contact 220 of relay 1SD1, front contact 221 of relay 1BCS1, the winding of relay 1BCS1 to (−). The relay 1SDP is dropped away by the opening of its stick circuit at front contact 168 of relay 1SD1, which stick circuit extends from (+) and includes the front contact 168 of relay 1SD1, front contact 222 and the winding of relay 1SDP to (−).

After the switch XW2 has been moved to a normal position nothing further occurs in regard to storage unit 2XS1. However, when the materials enter the area governed by photocell detector bank XW2–PC associated with switch XW2, the normally energized relay 2TR is deenergized thereby closing a pick-up circuit for relay 3TN1 which extends from (+) and includes back contact 223 of relay 2TR, back contact 224 of relay 2TN1, front contact 226 of relay 2SD1, front contact 227 of relay 2BCS1, front contact 228 of relay 2NWP, back contact 224 of relay 2TNP, wire 229a, back contact 230 of relay 3SD1, and the winding of relay 3TN1, to (−). As has been previously described with respect to the picking up of relay 2TN1 with regard to the transfer of a stored route description, the same situation is present regarding the picking up of relay 3TN1. That is, in order for the previously described pick-up circuit for relay 3TN1 to be completed, the called-for position of switch XW2 must be normal as evidenced by the energized condition of relay 2BCS1, and the switch XW2 must actually be in a normal position. The energizing of relay 3TN1 picks up relay 3SD1 by a pick-up circuit extending from (+) and including front contact 231 of relay 3TN1, front contact 232 of relay 3TR, the winding of relay 3SD1 to (−). Because of the fact that relay 2CCS1 was never energized as the particular materials concerned are destined for spur conveyer SC3, the picking up of relay 3SD1 does not complete the pick-up circuit for relay 3CCS1 which would extend from (+) and include the front contact 233 of relay 2CCS1, the front contact 234 of relay 3TN1, and the front contact 235 of relay 3SD1, to (−).

When the length of materials leaves the photocell detection bank XW2–PC, the stick circuit for relay 2SD1 is open, which stick circuit extends from (+), and includes front contact 236 of relay 2SD1, back contact 237 of relay 2TR, front contact 238 of relay 2NWP, the winding of relay 2SD1, to (−). The dropping away of relay 2SD1 causes the stick circuit holding relay 2SDP to open, which stick circuit extends from (+), and includes front contact 239 of relay 2SD1, front contact 240 of relay 2SDP, the winding of relay 2SDP, to (−). When relay 2SD1 is deenergized, relay 3TN drops away by the opening of its stick circuit at front contact 241 of relay 2SD1, which stick circuit extends from (+), and includes front contact 241 of relay 2SD1, wire 242a, the front contact 243 and the winding of relay 3TN1, to (−). When relay 3TN1 is dropped away, the pick-up circuit is complete for either of the switch control relays 3WN or 3WR depending upon the energized or deenergized condition of relay 3CCS1. In this particular situation relay 3CCS1 is deenergized, therefore the pick-up circuit for relay 3WR is closed. This circuit extends from (+), including front contact 244 of relay 3TR, center contact 245 of lever XW3L, point contact 246 of lever XW3L in its left-hand position, back contact 247 of relay 3TN1, front contact 248 of relay 3SD1, back contact 249 of relay 3CCS1, back contact 250 of relay 3RWP, back contact 251 of relay 3WN, and the winding of relay 3WR, to (−). Thus, the switch XW3 is moved to a reverse position according to the stored description.

When the materials enter the photocell detection unit associated with switch XW3 the normally energized relay 3TR is deenergized, thereby opening the stick circuit for 3SD1 which extends from (+) and includes front contact 257 of relay 3SD1, front contact 232 of relay 3TR, the winding of relay 3SD1 to (−). When 3SD1 is deenergized and relay 3TR is deenergized, the relay 3TP is picked up by a pick-up circuit which extends from (+) and includes back contact 252 of relay 3TR, back contact 253 of relay 3SD1, the winding of relay 3TP to (−). The picking-up of this relay permits the storage of a new description into storage unit 3XS1 before the materials leave the photocell detection unit XW3–PC by conditioning an alternate pick-up circuit for relay 3SD1 which extends from (+) and includes front contact 231 of relay 3TN1, the front contact 254 of relay 3TP, the winding of relay 3SDL to (−).

When the materials leave the photocell detection unit XW3–PC, the relay 3TR is again energized and relay 3TP is deenergized by the opening of back contact 252 of relay 3TR. The function of relay 3TP is to provide an alternate pick-up circuit for relay 3SD1 so that a new description can be stored in unit 3XS1 while a length of materials is occupying the photocell detection section XW3–PC.

In order for the conveyer system to function properly, the separate lengths of materials must be adequately spaced so that under normal conditions two succeeding lengths of materials will not occupy the area covered by the same exit switch photocell detection bank simultaneously. In other words, they must be spaced so that a certain length of materials completely clears a certain photocell detection unit before a succeeding length of materials enters and interrupts that particular photocell detection section.

In addition to providing a means for transferring a route description, as has been previously described, the photocell detection bank CPC (Figs. 3A–3C) provides the means for adequately spacing succeeding lengths of materials.

It has been pointed out with reference to Figs. 3A and 3B that the approach repeater relays AR control the movement of the approach conveyers AC and the positioning of the entrance switches EW. When a respective AR relay is energized by its previously described pick-up circuit, the stick relay RS is energized by a pick-up circuit extending from (+) and including the front contact 260 of relay ZR, the winding of relay RS, and either the front contact 261 of relay A3R if A3R is energized, or the front contact 262 if relay A2R is energized or the front contact 295 of relay A1R if relay A2R is energized, then through the lower winding of whichever AR relay is energized, to (−). Once an AR relay is energized, none of the other AR relays can be energized to activate another AC conveyer because the back contact 30 of relay RS opens the pick-up circuit for all of the other AR relays, which prevents a succeeding length of materials from being moved on to the main transport conveyers. However, when the length of materials reaches the photocell detection bank CPC (see Fig. 2A) the normally energized relay ZR is deenergized by the opening of its pick-up circuit which extends from (+) and includes front contact 263 of the CR relay associated with photocell unit CPC, wire 264a, and the winding of relay ZR to (—).

When the ZR relay is deenergized the relay RS is dropped away by the opening of front contact 260 of relay ZR in the energizing circuit for relay RS. Although the back contact 30 closes in the pick-up circuit for an AR relay, the deenergizing of relay ZR opens the pick-up circuit for a respective AR relay at front contact 31 of relay ZR and subsequently deenergizes the AR relay.

When the materials leave the photocell unit CPC, the relay ZR is again energized and the pick-up circuit for an AR relay is closed at front contact 31 of relay ZR.

Thus, it is apparent that a succeeding assembled length of materials will not advance onto the main transport conveyer until a preceding length of materials interrupts and subsequently clears the photocell detection unit CPC.

It is apparent from the previous description that the conveyer switch cannot be moved or operated either manually or automatically while materials occupy a photocell detection bank associated with a respective switch. Also, with respect to the entrance switches EW1 and EW2, it is apparent from the previous description that the materials will not advance from a feed conveyer until the switches are properly positioned.

However, in the event that an exit switch fails to complete a movement because of an obstruction or some other reason, a means must be provided to protect both the switch and approaching materials from the consequences of such an incomplete operation.

This is accomplished by the positioning of a photocell detection unit APC (see Fig. 2B) in advance of each exit switch. These photocell detection units are placed a sufficient distance ahead of each exit switch so that the conveyer drive motor will shut off and the conveyer will stop before the materials reach the defective conveyer switch.

Assuming that the switch XW1 is unable to be fully positionend and a group of materials is approaching, the interruption of the photocell unit APC1 results in the dropping away of the normally energized relay 1ATR.

The relay 1WC is always energized under normal conditions and its front contact 265 maintains the master control relay MCR energized for all the conveyer drive motors. Therefore, it is apparent that when the relay MCR is deenergized, the conveyer is shut down and ceases to move materials. The same principle applies to exit switches XW2 and XW3 regarding the associated relays 2WC and 3WC respectively.

When the area covered by the photocell detection bank APC1 is unoccupied, the energizing circuit for the conveyer control relay 1WC extends from (+) and includes front contact 266 of relay 1ATR, the winding of relay 1WC, to (—). However, when the relay 1ATR is dropped away, the 1WC relay is energized only when the switch XW1 is in a fully operated normal or reverse position. In the event that it is in a normal position, its energizing circuit will extend from (+) and include the front contact 267 of relay 1NWP, the winding of relay 1WC to (—). In the event that the switch is in a fully operated reverse position the energizing circuit extends from (+) and includes front contact 268 of relay RWP, the front contact 269 of the normally energized relay 1TFR, the winding of relay 1WC to (—). Therefore, if neither the NWP nor the RWP relay is energized, which is indicative of a partially operated switch position, and a group of materials interrupts the photocell unit APC1 the conveyer will completely stop. It can be seen from Figs. 3D, 3E and 3F that the front contact 265 of the relay 1WC, the front contact 270 of relay 2WC, and the front contact 271 of relay 3WC are in series in the energizing circuit for the MCR relay. Thus, the entire conveyer will shut down when any one of the exit switches is not in a fully operated position and the associated APC photocell bank is interrupted.

Due to the fact that the control panel is normally out of view of the exit portion of the conveyer and in most instances a great distance away, the following means are provided for automatically rerouting a group of materials to another spur conveyer in the event that the selected destination of a particular length of materials is already fully occupied. This condition is detected by the photocell units CC1–PC through CC4–PC associated with the approach to platforms P1 through P4 respectively. For example, when the approach to platform P1 along spur conveyer SC1 is not loaded to capacity, the parallel connected relays associated with the photocell unit CC1–PC maintains the relay 1TFR in an energized condition by a circuit extending from (+), and including the front contacts such as 272 of the relays CR in photocell unit CC1–PC, and the winding of relay 1TFR, to (—).

Assuming that the approach to the platform P1 is loaded to capacity, the control relay 1WR which controls the switch XW1 to a reverse position cannot be automatically energized because the pick-up circuit for relay 1WR is opened at the front contact 163 of relay 1TFR. However, a pick-up circuit will be completed for relay 1WN extending from (+), including front contact 154 of relay 1TR, center contact 283 and position contact 155 of lever XW1L, back contact 156 of relay 1TN1, front contact 157 of relay 1SD1, back contact 161 of relay 1ACS1, back contact 162 of relay 1RWP, back contact 273 of relay 1TFR, the winding of relay 1WN, and the back contact 160 of relay 1WR, to (—).

If switch XW1 is called to its reverse position by a stored description, this description would be, under conditions described earlier, cancelled because the switch failed to respond. It is desirable herein, however, to provide means for transferring the description in a selected manner so that the associated length of materials can be rerouted to a particular alternate destination. Thus, an alternate pick-up circuit for relay 2TN1 is closed at back contact 180 of relay 1TFR, thereby permitting the new description to be transferred to storage unit 2XS1.

According to the present embodiment, when an approach to a platform is loaded to capacity, materials destined for the full spur conveyer are automatically rerouted to the next spur conveyer on the same side of the main transport conveyer. Under conditions described earlier, the only CS relay energized under a normal routing to conveyer SC1 would be the relay 1ACS1; however, with material full conditions existing on SC1 as detected by CC1–PC, and the transfer to the next storage unit effected as above described, and the switch XW1 in a normal position, a description is stored which will route the respective materials to spur conveyer SC3 by energizing relay 2BCS1 by a pick-up circuit extending from (+) and including back contact 274 of relay 1TFR, wire 192a, front contact 193 of relay 2TN, front contact 194 of relay 2SD1, and the winding of relay 2BCS1 to (—).

However, when the last possible exit conveyer in the system is loaded to capacity, a means must be provided for preventing the piling up of materials because of the fact that there is no alternative route available. If this situation should occur the entire conveyer system will shut down. If the designated route is for platform P3 and the switch XW3 is in a reverse position the deenergizing of the relay 3TFR will interrupt the energizing circuit for the relay 3WC which extends from (+), and includes front contact 275 of relay 3RWP, front contact 276 of relay 3TFR, the winding of relay 3WC, to (—). The same condition exists for platform P4 when the switch XW3 is in a normal position by the opening of the energizing circuit for 3WC which extends from (+), and includes front contact 278 of relay 3NWP, front contact 279 of relay 4TFR, the winding of relay 3WC, to (—).

In the event that platform P1 becomes loaded to capacity at the same time a respective length of materials occupies the area governed by photocell bank APC1 and switch XW1 is in a fully operated reverse position, the conveyer will shut down by opening the energizing circuit for relay 1WC at front contact 269 of relay 1TFR. In the event that all of the platforms are loaded to capacity and another length of materials is transported over the main transport conveyer regardless of the destination called for, the conveyer will shut down when this group of materials reaches the photocell detection unit APC3 by deenergizing relay 3ATR, thereby opening the energizing circuit for relay 3WC, which extends from (+) and includes front contact 282 of relay 3ATR, the winding of relay 3WC, to (—). By the same token, if a route is designated for platform P1 and platform P3 is loaded-to-capacity, the conveyer will shut down when the materials reach the photocell detection unit 3PC1. Although a definite pattern for the alternative routing of materials is shown, any number of different patterns may be set up for the alternative routing of materials.

If the operator desires to change the destination of a particular route even though an automatic description has been set up, the levers XW1L, XW2L and XW3L will perform this function. As was previously shown, when the lever VW1L is moved from its lefthand or automatic position to its center position, a pick-up circuit will be complete for relay 1WR which will move the switch XW1 to a reverse position by the pick-up circuit which extends from (+) and includes front contact 154 of relay 1TR, the center contact 283 of lever XW1L, position contact 284 of lever XW1L, back contact 285 of relay 1RWP, back contact 164 of relay 1WN, winding of relay 1WR, to (—). Likewise, if the operator desires to manually move the switch XW1 to a normal position, a pick-up circuit for relay 1WN can be completed from (+), including front contact 154 of relay 1TR, center contact 283, contact 286 associated with the right-hand position of switch lever XW1L, back contact 287 of relay 1NWP, upper winding of relay 1WN, back contact 160 of relay 1WR, to (—). In the event that the switch XW1 is manually operated to a reverse position and the designated route calls for the normal position of the exit switch, thus requiring a transfer of the route description, the route description associated with the materials cannot be transferred because of the open condition of front contacts 179 and 176 of relay 1NWP in the pick-up circuit for relay 2TN1.

*The automatic movement of three successive groups of materials*

In view of the preceding description of the mode of operation of the conveyer system, an operational description of the system for successive lengths of materials can be given. In Fig. 6A–6J, the progress of three lengths of materials is traced from distinct feed conveyers over the main transport conveyer to distinct loading platforms as shown in Figs. 2A and 2B. The sequence of relay operations is shown in the companion drawings Figs. 7A–7J.

Figure 6A:
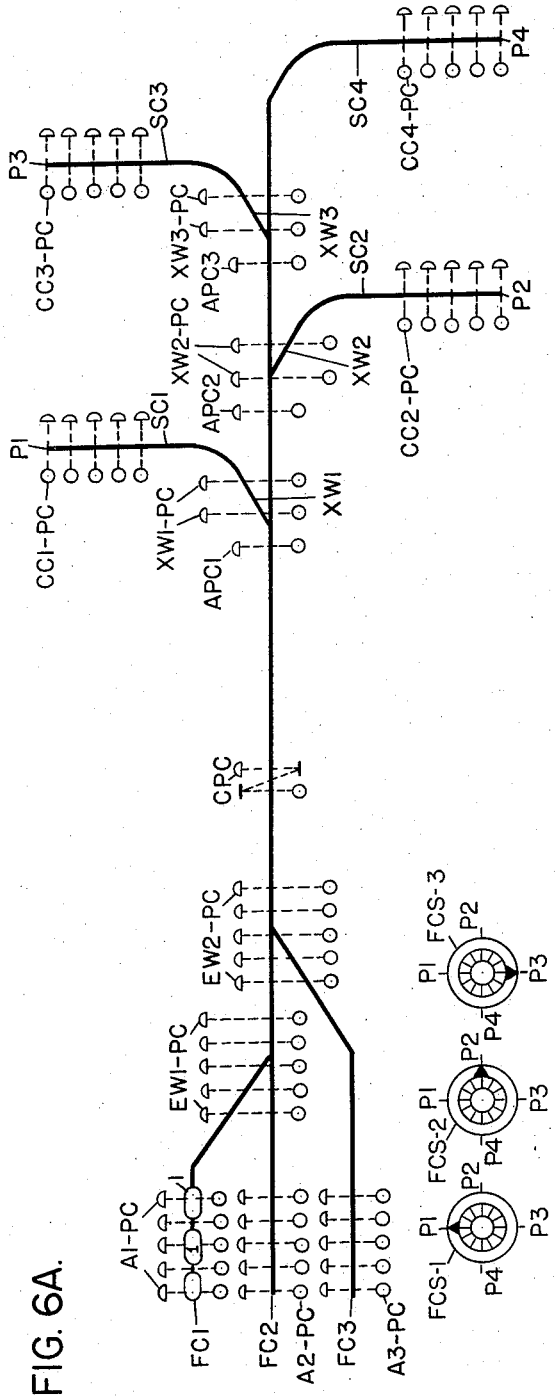
Figure 7A:
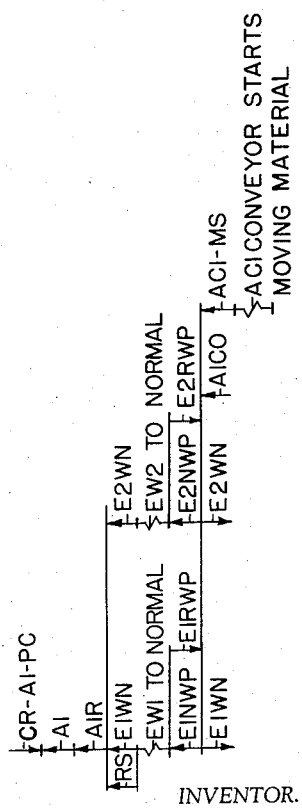

As shown in Figs. 6A–6J, by the control knobs FCS–1, FCS–2, and FCS–3, a length of materials emanating from feed conveyer FC1 is designated for spur conveyer SC1 and eventually platform P1. Materials entering from feed conveyer FC2 are designated for spur conveyer SC2 or platform P2 and materials loaded on the feed conveyer FC3 are to be routed to spur conveyer SC3 and platform P3. In Fig. 6A a group of materials designated as No. 1 is shown as being loaded on the feed conveyer FC1. When the group of materials No. 1 fully occupies the assembly area of feed conveyer FC1, the photocell bank A1–PC is deenergized thereby energizing relay A1R which moves switches EW1 and EW2 to normal positions. When the switches are fully positioned, switch indicator or repeater relays E1NWP and E2NWP are energized thereby permitting relay AC1–MS to close a circuit and commence moving the materials from left to right onto the main transport conveyer.

Simultaneously, with the energizing of the control relay AC1–MS a relay A1CO is energized which will prevent the movement of any further materials entering from FC1 until the waiting materials on FC2 and FC3 are conveyed.

Figures 6B, 7B:
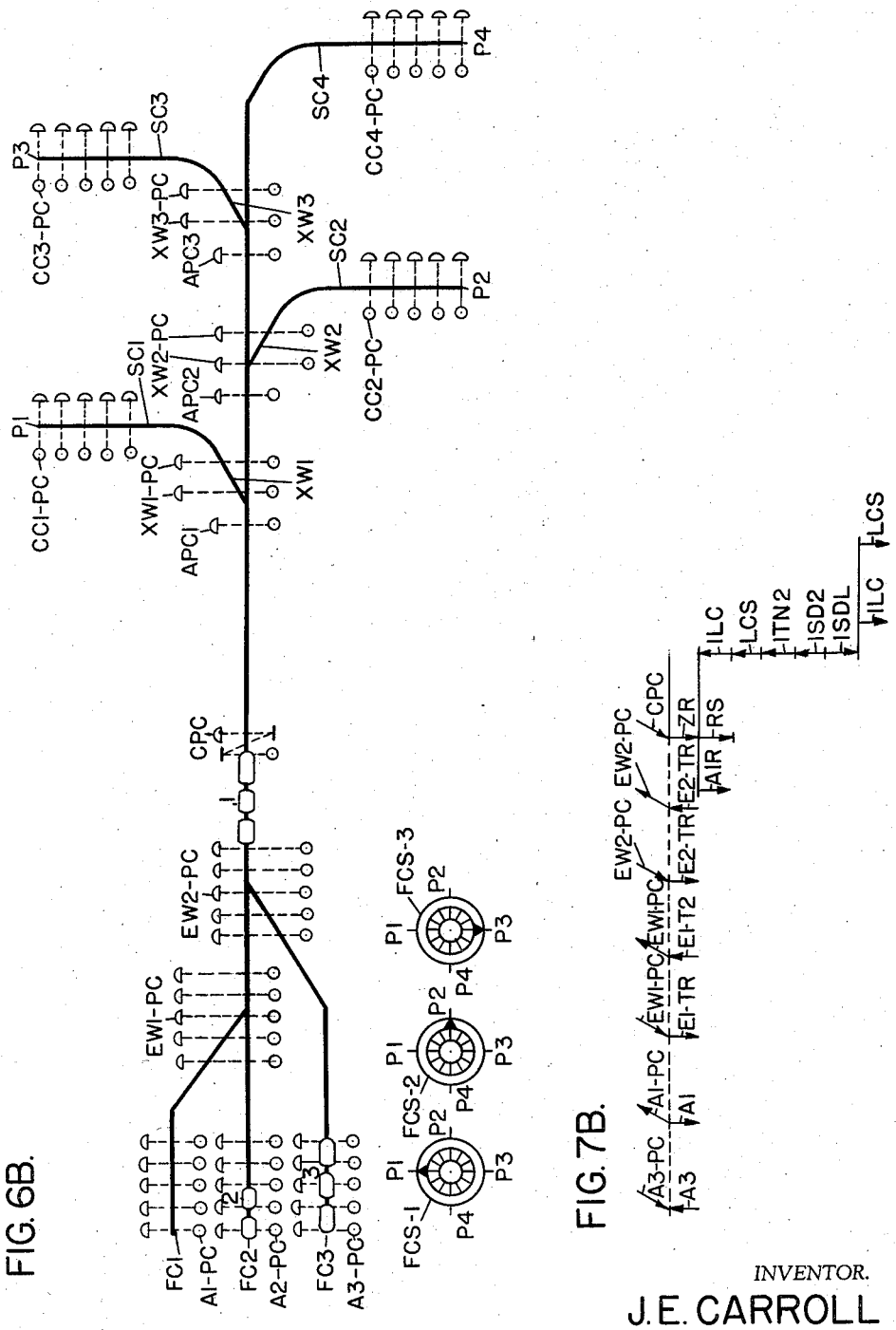

In Fig. 6B a length of materials designated as No. 2 is shown approaching the conveyer FC2; and a length of materials designated as No. 3 is shown as fully occupying the assembly area of the feed conveyer FC3.

The material length 1 having advanced over entrance switches EW1 and EW2 is shown entering the photocell unit CPC. It should be noted that after the length of materials 1 left the photocell unit A1–PC associated with FC1, the conveyer AC1 stopped moving so that another length of materials could be collected. The interrupting of photocell unit CPC energizes a control relay ZR which deenergizes the relays A1R and RS, thereby preventing the continued movement of materials. The interrupting of CPC causes the ZR relay to energize the route selection control relay 1LC, thereby conditioning storage unit 1XS2 with the route as designated. None of the CS relays are energized because as shown in Fig. 6C and Fig. 7C a route calling for the reverse position of the switch XW1 requires the deenergization of relay 1ACS1, and also no further switches will be encountered by this group of materials. In Fig. 7C the material group No. 1 has left the photocell unit CPC thereby transferring the description stored from storage unit 1XS2 to storage unit 1XS1. When the transfer of the storage in the unit 1XS1 is completed, switch control relay 1WR is energized thereby moving switch XW1 to a reverse position.

Material length No. 3 is shown as having advanced from the photocell indication unit A3–PC and as has been previously noted is designated for spur conveyer SC3. When the material group 1 left photocell control CPC, the approach control relay A3 became energized thereby moving entrance switch EW2 to a reverse position and thus causing the forward movement of material length No. 3. At this point it should be noted that the cut off relay A3CO is energized, thereby preventing any materials from entering the conveyer over FC3 until the group waiting at FC2 is transported.

Figures 6D, 7D:
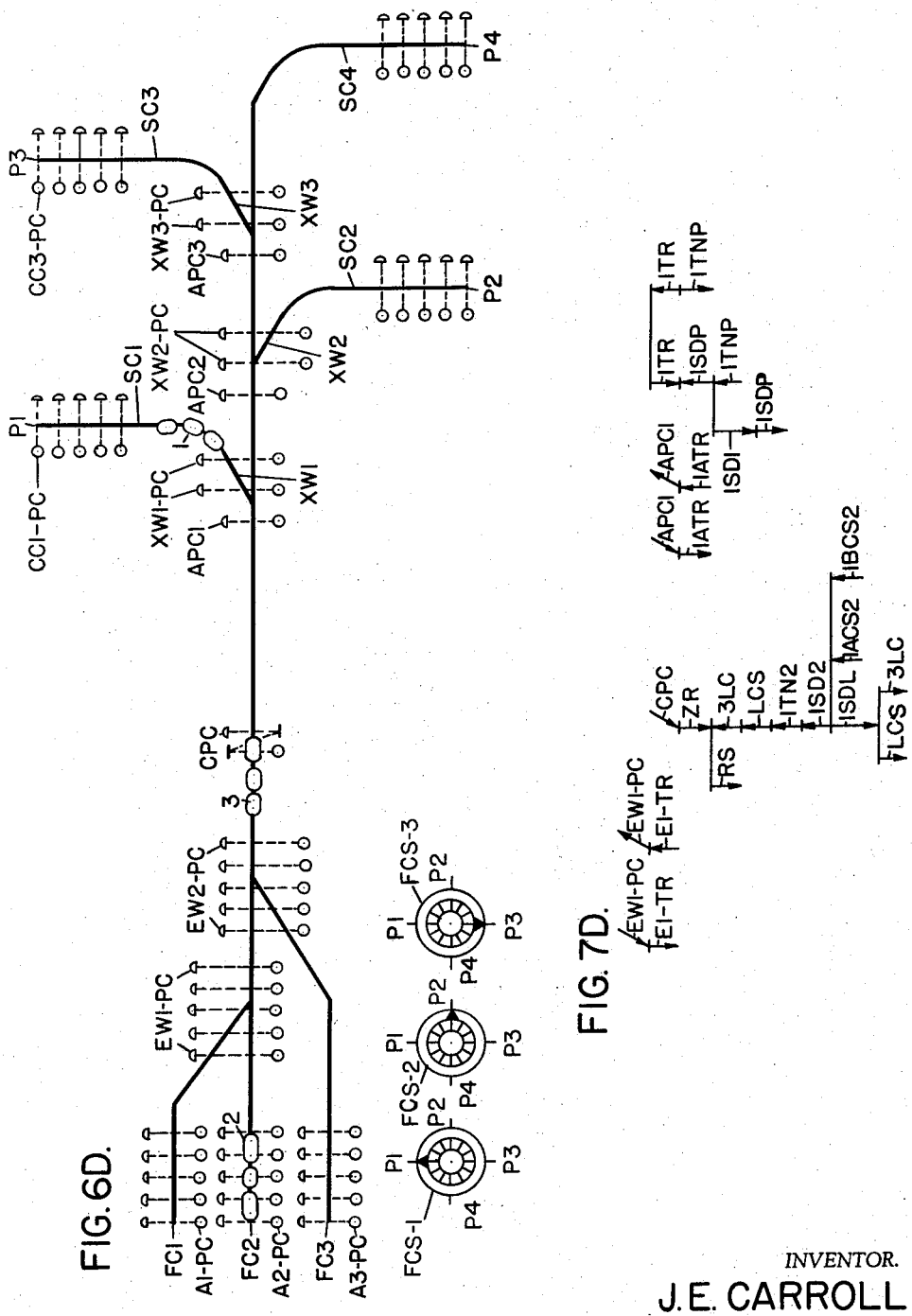

In Fig. 6D material group No. 1 has advanced into photocell unit XW1–PC which in effect cancelled the storage for this particular group of materials because no further transfer is necessary.

Group No. 3 is shown as entering the photocell unit CPC which results in the energizing of route control relay 3LC which causes the relay 1TN2 to become energized and also the code storage relays 1ACS2 and 1BCS2 thereby completing the transfer of a description leading to platform P3 in the storage unit 1XS2.

Material group 2 is now waiting for material group 3 to clear the photocell unit CPC.

Figure 6E:
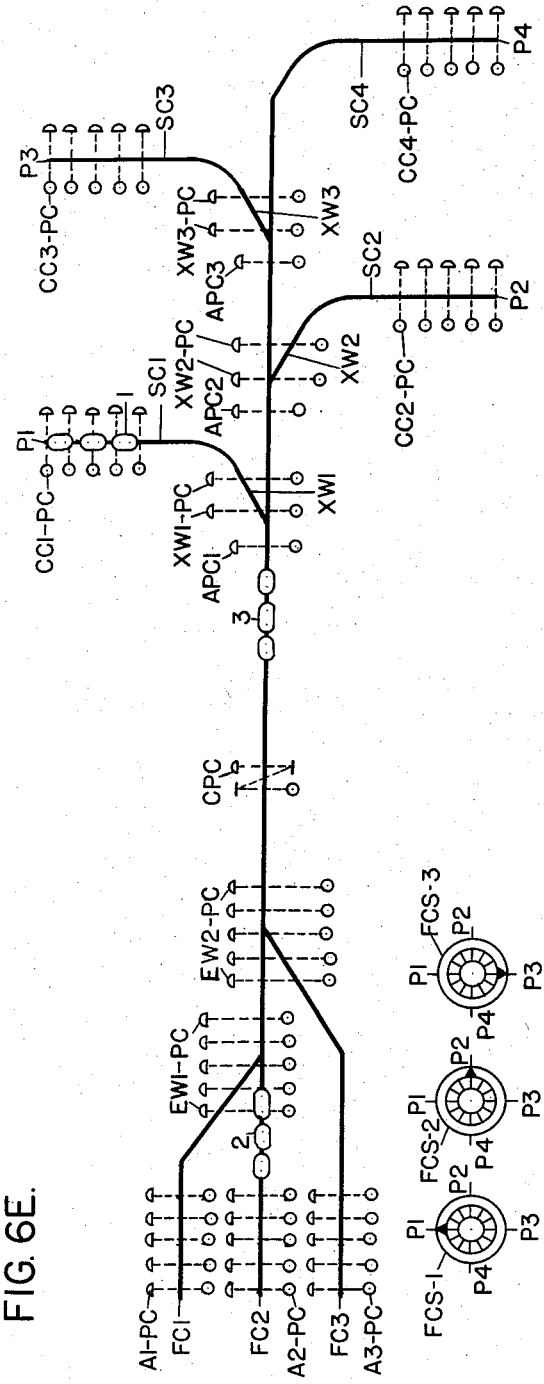
Figure 7E:
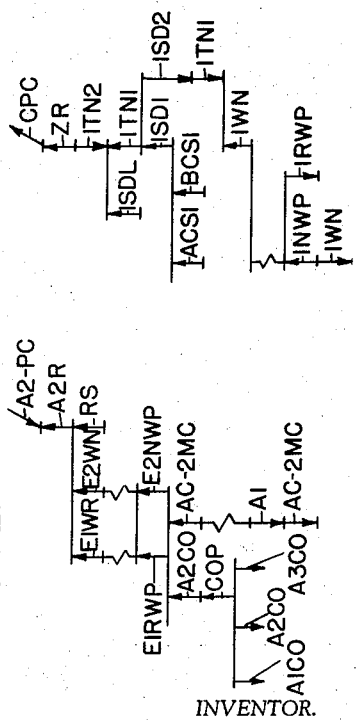

At this point entrance switch EW1 is in a normal position and EW2 is in a reverse position. Therefore, as shown in Figs. 6E and 7E, the switch EW1 must be operated to a reverse position and switch EW2 must be operated to a normal position before the material group No. 2 can move forward. Thus, as shown in Fig. 6E, group No. 3 has cleared the photocell unit CPC which allows the relay A2R to be energized which moves the entrance switches to the aforementioned positions. It should be noted at this point that as the group No. 2 leaves the photocell unit A2–PC the previously mentioned cut off relays ACO are all deenergized by the energizing of a cut off repeater relay COP; therefore, a group of materials waiting on any of the feed conveyers which had been previously used are now in a position to move materials.

When group No. 3 left photocell unit CPC the description stored in 1XS2 was transferred to 1XS1 and the description stored in 1XS2 is cancelled. Because of the fact that switch XW1 had previously been moved to a reverse position, relay 1WN is now energized, thereby moving the switch to a normal position to allow material length 3 to proceed to its destination. Also in Fig. 6E, material group 1 is shown as completely occupying the photocell unit CC1–PC thereby energizing relay 1TFR and preventing any automatic reverse movement of switch XW1.

Figure 6F:
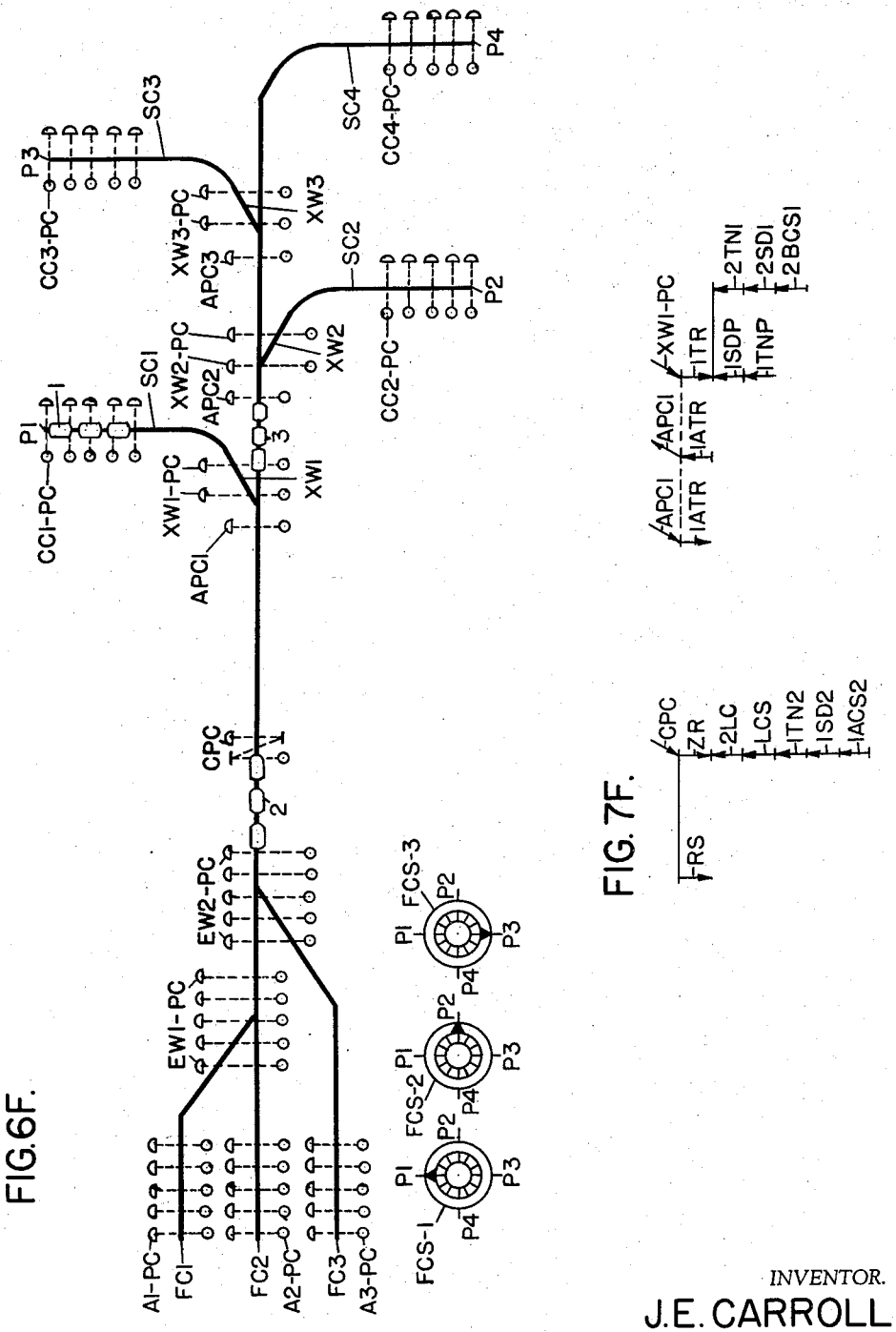
Figure 7F:
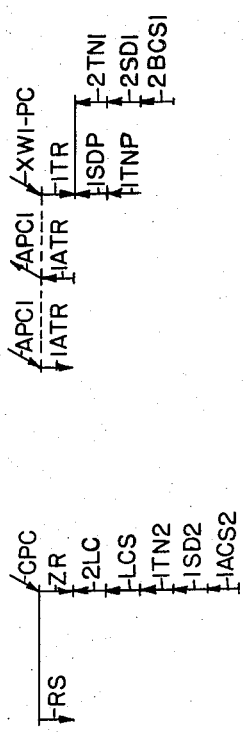

When group No. 3 enters the photocell detecting unit XW1–PC as shown in Fig. 6F, the description stored in 1XS1 is transferred to 2XS1 which energizes the code storage relay 2BCS1. As the material group No. 3 as shown by Fig. 6F still occupies the photocell unit for XW1 and XW1 was operated to a normal position, the storage indication relay 1SD1 remains in an energized condition thereby preventing another description to be transferred in storage unit 1XS1.

Material group 2 has advanced into photocell unit CPC thereby transferring the description for this group into storage unit 1XS2.

Figure 6G:
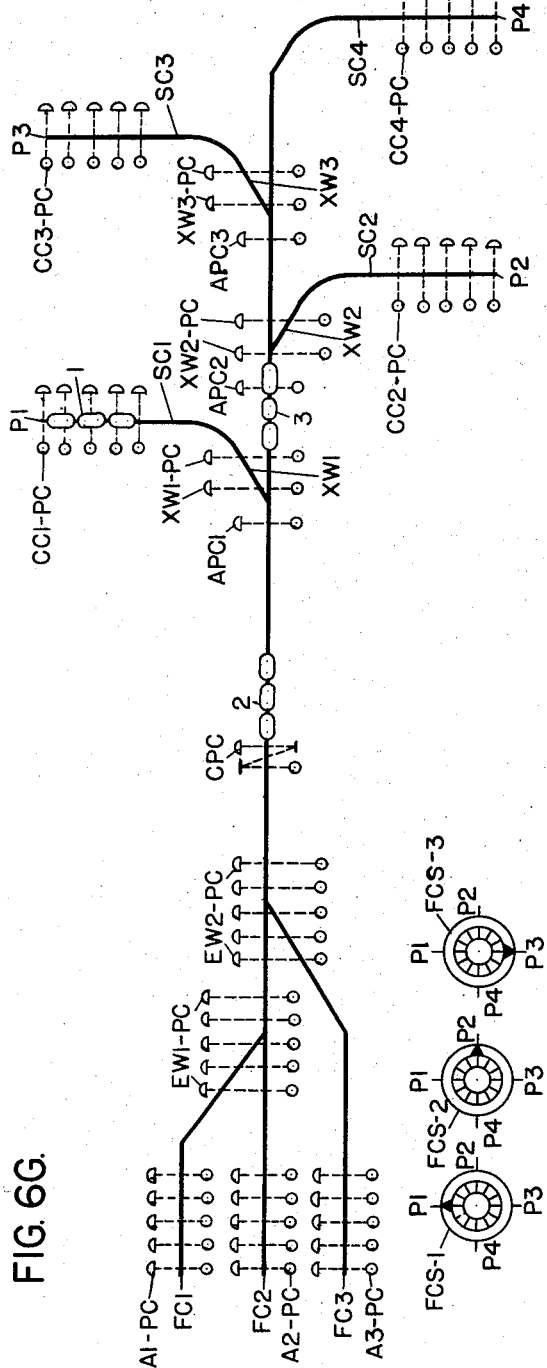
Figure 7G:
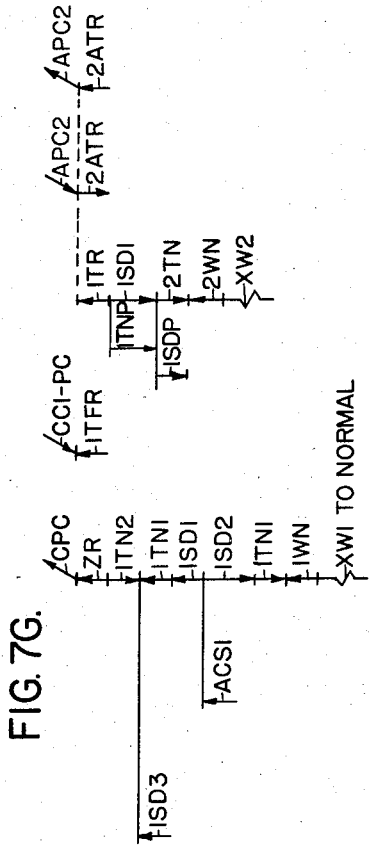

When the material group 2 leaves the photocell unit CPC as shown in Fig. 6G the entrance controls are all in a normal position and the description stored in 1XS2 is transferred to storage unit 1XS1. This transfer to storage unit 1XS1 occurred when the material group 3 left the photocell detection unit XW1–PC or when group 2 left CPC whichever occurred later. Because of the fact that the switch XW1 is already in a normal position and the description for group No. 2 requires a normal positioning of this switch, it stays in the same position. After the group 3 left the detecting unit XW1–PC the description stored in unit 1XS1 was transferred to storage unit 2XS1 and the switch XW2 is moved to a normal position.

Figure 6H:
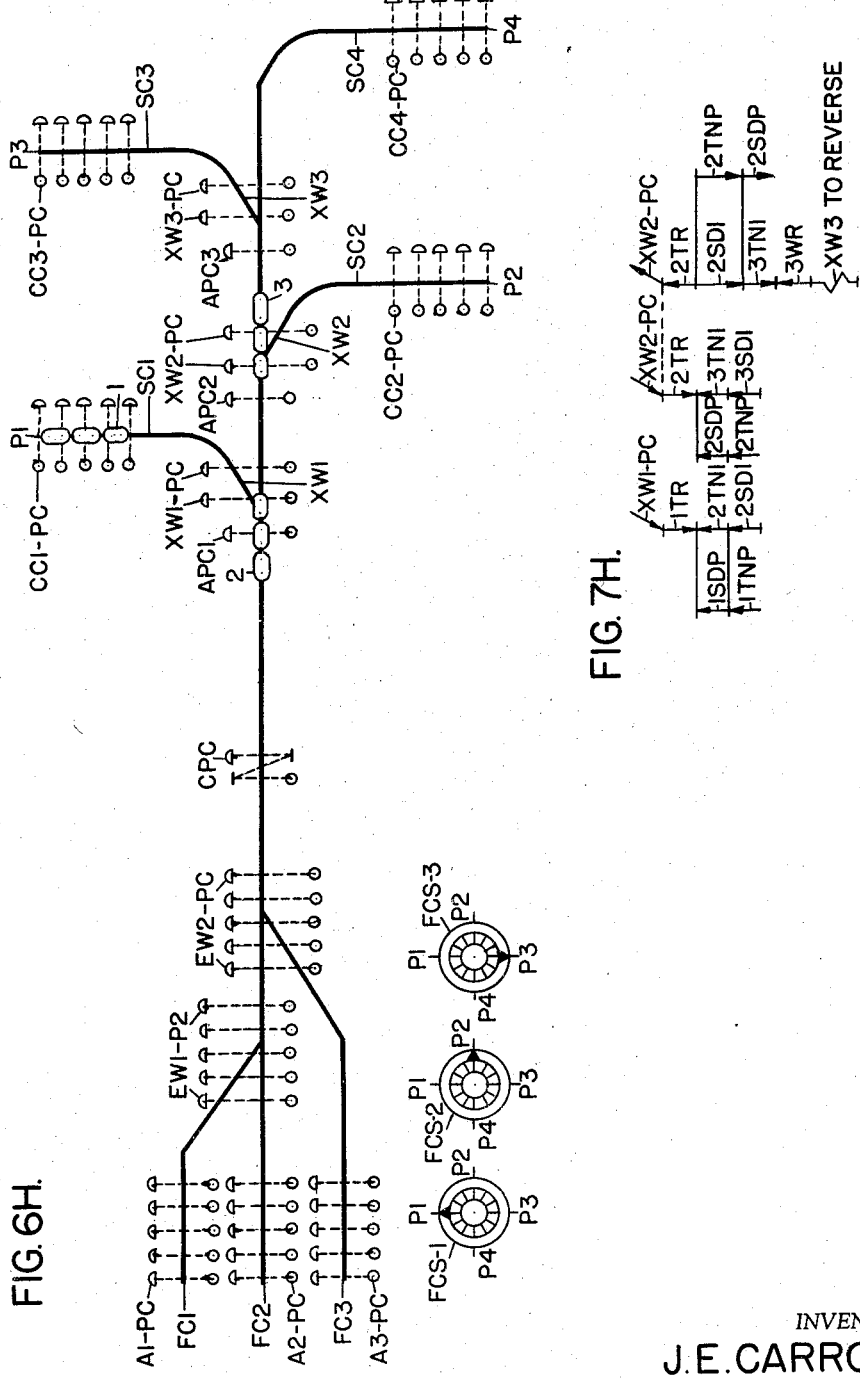
Figure 7H:
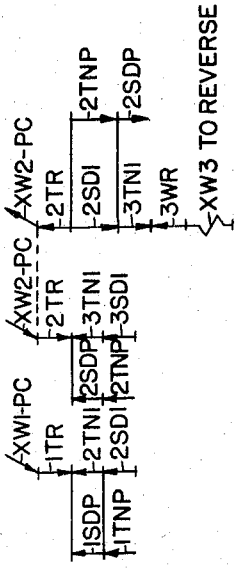

In Fig. 6H material group 3 has interrupted photocell unit XW2–PC thereby transferring the description stored in storage unit 2XS1 to storage unit 3XS1. However, the switch XW3 cannot be moved until this group leaves the photocell unit XW2–PC. Material group 2 is entering photocell unit XW1–PC which causes the description stored in 1XS2 to be cancelled, but no transfer of the description can be made from storage unit 1XS1 to storage unit 2XS1 until group No. 3 has cleared the photocell unit XW2–PC.

Figure 6J:
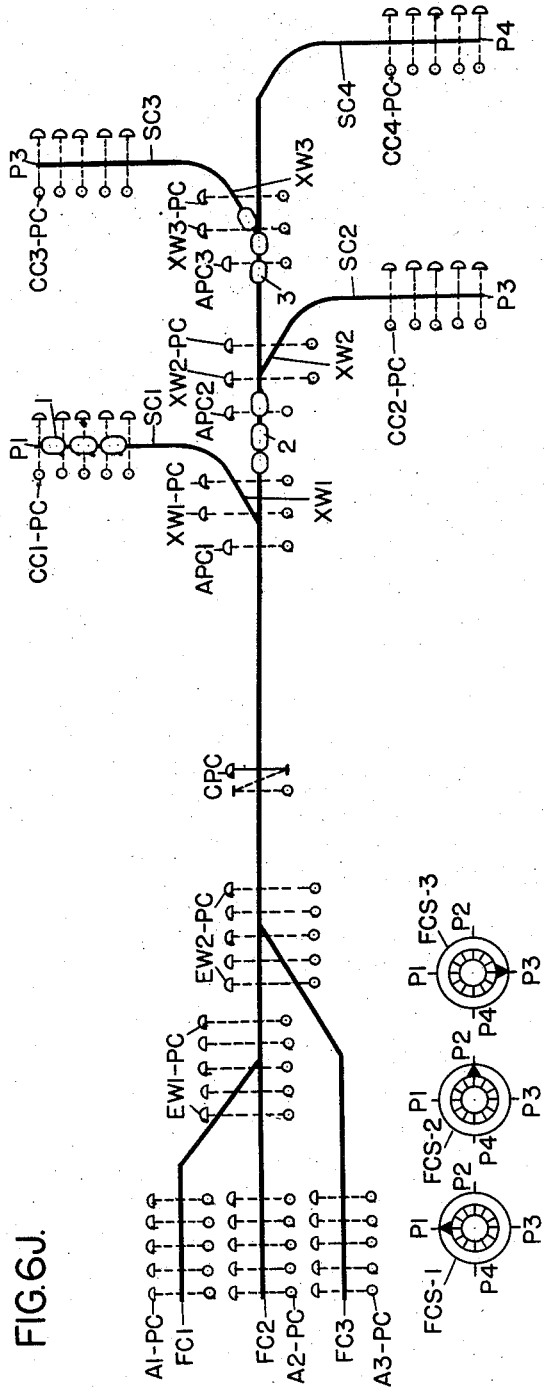
Figure 7J:
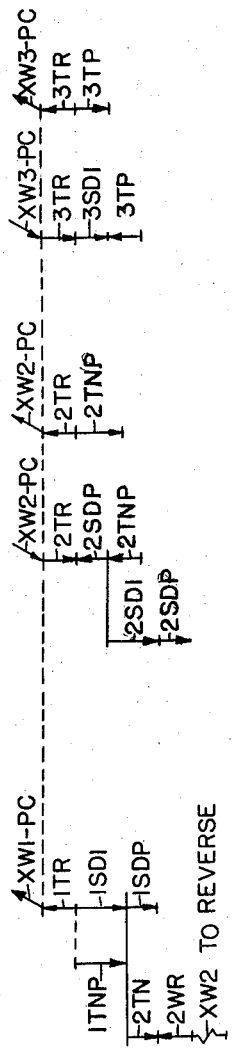

In Fig. 6J length No. 3 is shown as having cleared photocell unit XW2–PC and entering spur conveyer SC3. Because of the fact that switch XW2 was already in a normal position it was not moved when length No. 3 cleared the photocell unit XW2–PC. However, when material length 2 left photocell unit XW1–PC, switch XW2 moved to a reverse position and cancelled the description stored in 1XS1. It can now be assumed that the particular lengths of materials designated Nos. 2 and 3 will occupy their respective designations.

Having described an automatic conveyer system as one specific embodiment of the present invention, it is desired to be understood that this form is selected to facilitate in the disclosure of the invention rather than to limit the number of forms which it may assume; and, it is to be further understood that various modifications, adaptations, and alterations may be applied to the specific form shown to meet the requirements of practice without in any manner departing from the spirit or scope of the present invention.

What I claim is:

1. A control system for a materials conveyer organization having a plurality of feed conveyers leading to a main transport conveyer, an assembly conveyer section located between each of said feed conveyers and said main transport conveyer, power driven means for each assembly conveyer section, a means for detecting the presence of materials on each of said feed conveyers, and circuit means responsive to said material detection means for activating said power driven means for each of said assembly conveyer sections in a predetermined sequence.

2. A control system for a conveyer organization having a plurality of feed conveyers leading to a main transport conveyer, a normally-at-rest assembly conveyer section located between each of said feed conveyers and said main transport conveyer, a means for detecting the presence of a distinct length of materials on each of said feed conveyers, power driven means for each of said assembly conveyer sections, a first circuit means responsive to said material detection means for each of said feed conveyers for establishing a plurality of controls in a predetermined sequence, and second circuit means governed by said controls for activating said respective power driven means in turn.

3. A control system for an article conveying organization having a plurality of feed conveyers converging into a single main transport conveyer, power operated conveyer switches located at the said points of convergence for selectively aligning the available routes for a distinct length of materials from each of said feed conveyers onto the said main transport conveyer, a power driven assembly conveyer section located between each of said feed conveyers and the said conveyer switches, a means for detecting the presence of a distinct length of material on each of said feed conveyers, a first circuit means for selectively controlling the position of the said conveyer switches in response to any one of said material detection means, a second circuit means controlled by said first circuit means for the appropriate power driven assembly conveyer sections for the then available route, and a third circuit means responsive to the presence of a distinct length of materials on each of said feed conveyers and controlled subject to the previously activated condition of each of said assembly conveyer sections for activating said power driven assembly conveyer sections in a predetermined sequence.

4. A control system for a conveyer organization having a plurality of feed conveyers leading to a normally moving main transport conveyer, a normally at rest assembly conveyer section for each of said feed conveyers located between each of said feed conveyers and said main transport conveyers, a first detection means for detecting the presence of a distinct length of materials on each of said feed conveyers, a second detection means for detecting the presence of materials at a predetermined position on said main transport conveyer, a power driven means for each of said assembly conveyer sections, a first circuit means responsive to said feed conveyer detection means for activating said power driven means for the corresponding assembly conveyer section, a second circuit means responsive to the passage of a first distinct length of materials towards said main transport conveyer for causing all of said power driven means to be unresponsive to said first circuit means, and a third circuit means controlled by said second detection means in response to the presence of said first distinct length of materials adjacent to said second detection means for rendering said second circuit means ineffective, thereby permitting a succeeding length of materials to be conveyed from any feed conveyer to said main transport conveyer.

5. A control system for a conveyer organization having a plurality of feed conveyers leading to a normally moving main transport conveyer, a normally-at-rest assembly conveyer section located between each of said feed conveyers and said main transport conveyer, power driven means for each assembly conveyer section, a first detection means for detecting the presence of a distinct length of materials on each of said feed conveyers, a second detection means for detecting the presence of materials at a predetermined position on said main transport conveyer, a first circuit means responsive to said first material detection means for activating said power driven means for the corresponding assembly conveyer sections in a predetermined sequence, a second circuit means responsive to the passage of a first distinct length of materials toward said main transport conveyer for rendering said first circuit means ineffective for all of said assembly conveyer sections, a third circuit means controlled by said second detection means in response to the presence of said first distinct length of materials adjacent to said second detection means for rendering said second circuit means ineffective thereby permitting a succeeding length of materials to be conveyed on to said main transport conveyer.

6. A control system for an article conveying organization having a plurality of feed conveyers converging onto a single main transport conveyer and a plurality of exit spur conveyers leading off said main transport conveyer for selectively conveying materials from any one of said feed conveyers to any one of said exit spur conveyers, a power operated switching means located at the junction of each spur conveyer and said single main transport conveyer for aligning a distinct exit route from said main transport conveyer, a normally operated route selecting means, a first circuit means for controlling any of said power operated switching means as determined by said route selecting means, and a second circuit means responsive to the presence of materials being conveyed on a respective feed conveyer for distinctively controlling said first circuit means.

7. A control system for an article conveying organization having a plurality of feed conveyers leading into a single main conveyer and a plurality of spur conveyers leading off said single main conveyer, a means for detecting the presence of a distinctive length of materials being conveyed from each of said feed conveyers, a conveyer switching means located at the juncture of each of said spur conveyers and said single main conveyer, power driven means for positioning each of said switching means to a normal or reverse position, a manually operable exit route selection means associated with each of said feed conveyers for designating a distinct exit route, and a circuit means controlled by said material detection means and said manually operable route selection means for activating selected ones of said power driven switching means for aligning a distinct exit route for a distinctive length of materials from said main conveyer.

8. A control system for an article conveying organization having a plurality of feed conveyers converging into a single main conveyer and a plurality of exit spur conveyers leading off said single main conveyer, a power operated entrance switch located at the junction of each of said feed conveyers and said main transport conveyer for selectively aligning available routes from a respective feed conveyer onto the main conveyer, a power operated exit switch located at the junction of each of said exit spurs and said main conveyer for selectively aligning an available route from said main conveyer to a distinct spur conveyer, an entrance detection means for detecting the presence of a distinct length of materials on each of said feed conveyers, a manually operable exit route selection means associated with each of said feed conveyers for designating a respective exit route for materials being conveyed from a respective feed conveyer, an exit detection means for detecting the presence of distinct length of materials at spaced intervals along said main conveyer, a first circuit means responsive to a respective entrance material detection means for properly positioning said entrance switches, and second circuit means controlled by said first circuit means and said manually operable route selection means and said exit detection means for sequentially positioning selected ones of said exit switches.

9. A control system for an article conveyer organization having a plurality of feed conveyers leading to a main transport conveyer and a plurality of exit spur conveyers leading off said main transport conveyer, an assembly conveyer section located between each of said feed conveyers and said main transport conveyer, power driven means for each assembly conveyer section, a means for detecting the presence of materials on each of said feed conveyers, a first circuit means responsive to said material detection means for activating the said power driven means for each of said assembly conveyer sections in a predetermined sequence, route selection means, a power operated switching means located at the junction of each spur conveyer and said main transport conveyer for aligning a distinct exit route from said main transport conveyer, second circuit means associated with each of said feed conveyers for controlling said power operated switching means as determined by said route selection means, and a third circuit means governed by said first circuit means for selectively controlling a said second circuit means.

10. A control system for a conveying organization having a plurality of feed conveyers converging into a single main conveyer and a plurality of exit spur conveyers diverging from said single main conveyer comprising, a power operated entrance conveyer switch located at both of said points of convergence for selectively aligning available routes for a distinct length of materials from each of said feed conveyers onto the said main conveyer, a power operated exit switch located at the junction of each of said exit spurs and said main conveyer for aligning a route from said main conveyer to a distinct spur conveyer, a power driven assembly conveyer section located between each of said feed conveyers and said entrance switches, a first detection means for detecting the presence of a distinct length of material on each of said feed conveyers, a first circuit means for moving entrance switches to a proper position in response to a respective material detection means, a second circuit means controlled by said first circuit means for activating the appropriate power driven assembly conveyer section for the then available route, a third circuit means responsive to the presence of a distinct length of materials on each of said feed conveyers and controlled subject to the previously activated condition of each of said assembly conveyer sections for activating said power driven assembly conveyer sections in a predetermined sequence, a manually operable exit route selection means associated with each of said feed conveyers for designating an exit route for materials being conveyed from a respective feed conveyer, and a fourth circuit means controlled by said first and second circuit means and said manually operable exit route selection means for positioning selected ones of said exit switches.

11. A control system for a conveyer organization having a plurality of feed conveyers leading to a main transport conveyer and a plurality of exit spur conveyers leading off said main transport conveyer, an assembly conveyer section located between each of said feed conveyers and said main transport conveyer, power driven means for each assembly conveyer section, a first detecting means for detecting the presence of a distinct length of materials on each of said feed conveyers, a second detecting means for detecting the presence of a distinct length of materials at a predetermined position on said main transport conveyer, a power operated switching means located at the junction of each spur conveyer and said main transport for aligning a distinct exit route from said main transport conveyer, route selection means, a first circuit means responsive to said first detection means for activating said power driven means for the corresponding assembly conveyer sections in a predetermined sequence, a second circuit means responsive to the passage of a first distinct length of materials toward said main transport conveyer for rendering said first circuit means ineffective for all of said assembly conveyer sections, a third circuit means controlled by said second detection means in response to the presence of said first distinct length of materials adjacent to said second detection means for rendering said second circuit means ineffective, a fourth circuit means for controlling any of said power operated switching means as determined by said route selection means, and a fifth circuit means responsive to the presence of materials being conveyed from a respective feed conveyer for controlling said fourth circuit means.

12. A control system for an article conveying organization having a plurality of feed conveyers converging into a normally moving single main conveyer and a plurality of exit spur conveyers diverging from the said single main conveyer comprising, power operated entrance conveyer switches located at said points of convergence for selectively aligning available routes for a distinct length of materials from each of said feed conveyers onto the said main conveyer, a power operated exit switch located at the junction of each of said exit spurs and said main transport conveyer for selectively aligning a distinct route from said main conveyer to a respective spur conveyer, a power driven assembly conveyer section located between each of said feed conveyers and said entrance switches, a first detection means for detecting the presence of a distinct length of materials on each of said feed conveyers, a second detection means for detecting the presence of a distinct length of materials at a predetermined position on said main transport conveyer, a manually operable exit route selection means associated with each of said feed conveyers for designating a respective exit route for materials being conveyed from a respective feed conveyer, a first circuit means for selectively controlling the position of said entrance switches in response to any one of said material detection means, a second circuit means controlled by said first circuit means for activating a corresponding power driven assembly conveyer section for the then available route, a third circuit means responsive to the presence of a distinct length of materials on each of said feed conveyers and controlled subject to the previously activated condition of each of said power driven assembly conveyer sections for energizing selected power driven assembly conveyer sections in a predetermined sequence, a fourth circuit means responsive to the passage of a first distinct length of materials toward said main transport conveyer for causing all of said assembly conveyer section power driven means to be unresponsive to said second circuit means, a fifth circuit means controlled by said second detection means for rendering said fourth circuit means ineffective, and a sixth circuit means controlled by said first circuit means and said manually operable route selection means for positioning selected ones of said exit switches.

13. A control system for an article conveying organization having a plurality of feed conveyers converging onto a single main transport conveyer and a plurality of exit spur conveyers leading off said main transport conveyer for selectively conveying materials from any one of said feed conveyers to any one of said exit spur conveyers, a power operated switching means located at the junction of each spur conveyor and said single main transport conveyer for aligning a distinct exit route from said main transport conveyer, route selecting means, associated with each feed conveyer, said route selection means being operable to designate a distinct spur conveyer, a first detection means for detecting the presence of distinct lengths of materials at spaced intervals along said main transport conveyer, a first circuit means for controlling any of said power operated switching means as determined by said route selecting means and said first detection means, a second detection means for detecting the presence of materials on each of said exit spur conveyers, a second circuit means responsive to said detection means for at times rendering the first circuit means ineffective, and an alternate exit control circuit means for activating a respective switching means to an alternate position as governed by said second detection means.

14. In a control system for an article conveyer organization having a plurality of spur conveyers leading off a main transport conveyer for selectively delivering a plurality of distinct lengths of materials to respective destinations, a conveyer switch having a normal and reverse position located at the junction of each of said exit spurs and said main transport conveyer, a power driven means for positioning each of said exit switches to a respective normal or reverse position, a manually operable route selection means for designating a distinct spur conveyer for a respective distinct length of materials, a route description storage means for each of said exit switches, circuit means for distinctively conditioning said storage means for each exit switch to be included in a route off said main transport conveyer in accordance with said route selection means, a first circuit means for effecting the power operation of said exit switches in response to a position selected for the exit switch in sequence in a route by the associated route description storage means, transfer means for each of said storage means except the storage means provided for the last exit switch to be included in a route, a means for detecting the presence of materials on each of said exit spurs, and a second circuit means for activating said transfer means and for storing a pre-selected alternate route description in a said storage means in response to an associated exit spur material detection means.

15. A control system for an article conveying organization having a plurality of feed conveyers converging onto the single main transport conveyer and a plurality of exit spur conveyers leading off said main transport conveyer for selectively conveying materials from any one of said feed conveyers over said main transport conveyor to any one of said exit spur conveyers, a power operated switching means located at the junction of each spur conveyer and said single main transport conveyer for aligning a distinct exit route from said main transport conveyer, a power driven means for said main transport conveyer, route selecting means, a first circuit means for controlling any of said power operated switching means as determined by said route selecting means a main transport material detection means activated in response to the presence of materials on said main transport conveyer, a spur conveyer material detection means activated in response to a loaded to capacity condition of each of said exit spur conveyers, and a second circuit means for shutting off said power driven means in response to the activated condition of each main transport material detection means in accordance with the activated condition of the spur conveyer material detection means and condition of said switching means associated with exit spur conveyers located in advance of a length of materials being conveyed on said main transport conveyer.

16. A control system for an article conveying organization having a plurality of feed conveyers converging onto a normally moving single main transport conveyer and a plurality of exit spur conveyers leading off said main transport conveyer for selectively conveying materials from any one of said feed conveyers to any one of said exit spur conveyers, a power driven means for said main transport conveyer, a power operated switching means located at the junction of each spur conveyer and said single main transport conveyer for aligning a distinct exit route from said main transport conveyer, a route selecting means associated with each said conveyer for designating a distinct exit conveyer for a respective length of materials, a first circuit means for controlling any of said power operated switching means as determined by said route selecting means, a detection means for detecting the presence of materials on each of said exit spur conveyers, a second circuit means for activating said power operated switching means to a preselected position in response to said detection means, a third circuit means controlled by said second material detection means associated with said exit spur conveyers available for a respective length of materials for shutting off said power means.

17. A control system for a conveyer organization having a plurality of feed conveyers leading to a main transport conveyer and a plurality of exit spur conveyers leading off said main transport conveyer, an assembly conveyer section located between each of said feed conveyers and said main transport conveyer, a first power driven means for each assembly conveyer section, a second power driven means for said main transport conveyer and said exit spur conveyers, a first detecting means for detecting the presence of a distinct length of materials on each of said feed conveyers, a second detecting means for detecting the presence of a distinct length of materials at a predetermined position on said main transport conveyer, a power operated switching means located at the junction of each spur conveyer and said main transport for aligning a distinct exit route from said main transport conveyer, route selection means, a first circuit means responsive to said first detection means for activating said power driven means for the corresponding assembly conveyer sections, a third detecting means for detecting the presence of materials on each of said exit spur conveyers, a second circuit means responsive to the passage of a first distinct length of materials toward said main transport conveyer for rendering said first circuit means ineffective for all of said assembly conveyer sections, a third circuit means controlled by said second detection means in response to the presence of said first distinct length of materials adjacent to said second detection means for rendering said second circuit means ineffective, a fourth circuit means for controlling any of said power operated switching means as determined by said route selection means, and a fifth circuit means responsive to the presence of materials being conveyed from a respective feed conveyer for controlling said fourth circuit means, a sixth circuit means governed by the third detection means associated with the intended said exit spur conveyer as designated by said route selection means for controlling said power operated switching means, and a seventh circuit means controlled by said third material detection means associated with said spur conveyers available for a respective length of materials for shutting off said power driven means.

18. A control system for a conveyer organization having a plurality of feed conveyers leading to a main transport conveyer and a plurality of exit spur conveyers leading off said main transport conveyer, an assembly conveyer section located between each of said feed conveyers and said main transport conveyer, a first power driven means for each assembly conveyer section, a second power driven means for said main transport conveyer and said exit spur conveyers, a first detecting means for detecting the presence of a distinct length of materials on each of said feed conveyers, a second detecting means for detecting the presence of a distinct length of materials at a predetermined position on said main transport conveyer, a power operated switching means located at the junction of each spur conveyer and said main transport for aligning a distinct exit route from said main transport conveyer, route selection means, a first circuit means responsive to said first detection means for activating said power driven means for the corresponding assembly conveyer sections in a predetermined sequence, a third detection means for detecting the presence of materials on each of said exit spur conveyers, a second circuit means responsive to the passage of a first distinct length of materials toward said main transport conveyer for rendering said first circuit means ineffective for all of said approach conveyer sections, a third circuit means controlled by said second detection means in response to the presence of said first distinct length of materials adjacent to said second detection means for rendering said second circuit means ineffective, a fourth circuit means for controlling any of said power operated switching means as determined by said route selection means, and a fifth circuit means responsive to the presence of materials being conveyed from a respective feed conveyer for controlling said fourth circuit means, a sixth circuit means governed by the third detection means associated with the intended said exit spur conveyer as designated by said route selection means for controlling said power operated switching means, and a seventh circuit means controlled by said third material detection means associated with said spur conveyers available for a respective length of materials for shutting off said power driven means.

19. In a conveyer control system for a material conveyer organization having a plurality of exit spur conveyers leading off a main transport conveyer, each of said exit spur conveyers being connected to said transport conveyer by a conveyer switch, each of said conveyer switches being operable to a full normal and a full reverse position, a motor means operable when energized to cause materials to move over said main transport conveyer and said conveyer switches, a normal switch repeater relay having a contact which is closed in response to the operated full normal position of its respective conveyer switch, a reverse switch repeater relay having a contact which is closed in response to the full reverse position of its respective conveyer switch, a material detection means activated in response to the presence of material approaching each conveyer switch over said main transport conveyer, an approach detection relay having a contact which is closed in response to the inactive condition of said material detection means, and a circuit means for energizing said motor means, said circuit means including the closed contacts of the normal switch repeater relay and the reverse switch repeater relay and the approach detection relay in parallel relationship.

20. In a conveyer control system for a material conveyer organization having an exit spur conveyer connected to a main transport conveyer by an exit conveyer switch, said conveyer switch being operable to permit materials to move over said main transport conveyer switch only when in a fully operated normal or reverse position, a motor means operable when energized to cause materials to move over said main transport conveyer and said conveyer switch, a material detection means activated in response to the presence of materials approaching said conveyer switch over said main transport conveyer, and circuit means responsive to the activated condition of said material detection means for energizing said motor means only when said conveyer switch is in a fully operated position.

21. A control system for a conveyer organization having a plurality of feed conveyers leading to a main transport conveyer and a plurality of exit spur conveyers leading off said main transport conveyer, each of said feed conveyers being connected to said main transport conveyer by an entrance switch, said switch being operable to selectively align a distinct route from one of said feed conveyers to said main transport conveyer, each of said exit spur conveyers being connected to said main transport conveyer by an exit switch, said exit switch being operable to set up a distinct exit route for materials on said main transport conveyer to any one of said exit spur conveyers, a manually operated route selection means for each of said feed conveyers, circuit means responsive to the respective position of said entrance switches and the designation of a respective route selection means for setting up a distinct route to any one of said exit spur conveyers for a length of materials being conveyed from a distinct feed conveyer.

22. In a control system for an article conveying organization having a plurality of feed conveyers leading to a main transport conveyer and a plurality of exit spur conveyers leading off said main transport conveyer, a power operated entrance switch located at the junction of each feed conveyer and said main transport conveyer for selectively aligning a route from one of said feed conveyers to said main transport conveyer, a power operated exit switch located at the junction of each exit spur conveyer and said main transport conveyer for selectively aligning a route from said main transport conveyer to one of said exit spur conveyers, an exit route designation means for each of said feed conveyers, each of said route designation means being operable to select a distinct exit route for materials being conveyed on its respective feed conveyer, a route description storage relay bank for each of said exit conveyer switches, said storage relay banks having a relay for each of the maximum number of exit conveyer switches that can be included in a route of the main transport conveyer, transfer means provided for each of said storage relay banks except the storage relay bank associated with the last exit switch for transferring a distinct route description to the next succeeding relay bank associated with the next conveyer exit switch included in a respective route, a first material detection means located on said main transport conveyer operable when activated to detect the presence of a distinct length of materials being conveyed on said main transport conveyer, a second material detection means on said main transport conveyer operable when activated to detect the presence of a distinct length of materials passing over each of said exit conveyer switches, circuit means responsive to the actual position of said entrance switches for selecting a distinct route designation means associated with a distinct feed conveyer, a circuit means responsive to the first material detection means and said selected route designation means for conditioning the relays of said storage relay bank for the first conveyer exit switch to be passed through by a distinct length of materials, and a transfer circuit means responsive to said second material detection means in sequence for transferring the route description stored in the preceding storage relay bank.

References Cited in the file of this patent

UNITED STATES PATENTS

| | | |
|---|---|---|
| 1,800,898 | Nelsen | Apr. 14, 1931 |
| 2,076,955 | Livingston | Apr. 13, 1937 |
| 2,298,829 | McCann | Oct. 13, 1942 |
| 2,304,447 | Feusier | Dec. 8, 1942 |
| 2,470,922 | Dunn | May 24, 1949 |
| 2,494,435 | Freeman | Jan. 10, 1950 |
| 2,700,728 | Brixner et al. | Jan. 25, 1955 |
| 2,714,355 | Benson | Aug. 2, 1955 |

FOREIGN PATENTS

| | | |
|---|---|---|
| 455,637 | Canada | Apr. 5, 1949 |